United States Patent
Nogami et al.

(10) Patent No.: US 8,920,235 B2
(45) Date of Patent: Dec. 30, 2014

(54) COMPUTER-READABLE STORAGE MEDIUM, INFORMATION PROCESSING APPARATUS, INFORMATION PROCESSING SYSTEM AND INFORMATION PROCESSING METHOD

(71) Applicant: Nintendo Co., Ltd., Kyoto (JP)

(72) Inventors: Hisashi Nogami, Kyoto (JP); Tomoaki Tsuji, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 13/850,892

(22) Filed: Mar. 26, 2013

(65) Prior Publication Data

US 2013/0215025 A1 Aug. 22, 2013

Related U.S. Application Data

(63) Continuation of application No. 13/325,436, filed on Dec. 14, 2011.

(30) Foreign Application Priority Data

Jun. 3, 2011 (JP) .................................. 2011-125646

(51) Int. Cl.
*A63F 9/24* (2006.01)
*G06F 3/14* (2006.01)
*G06F 3/033* (2013.01)
*H04N 21/414* (2011.01)
*H04N 21/478* (2011.01)
*A63F 13/00* (2014.01)
*H04N 21/41* (2011.01)

(52) U.S. Cl.
CPC .............. *G06F 3/1423* (2013.01); *G06F 3/033* (2013.01); *A63F 2300/204* (2013.01); *H04N 21/41407* (2013.01); *H04N 21/4781* (2013.01); *A63F 13/00* (2013.01); *H04N 21/4122* (2013.01); *A63F 2300/301* (2013.01)
USPC .......... 463/30; 463/1; 463/39; 463/40; 463/43

(58) Field of Classification Search
CPC .......... A63F 13/00; A63F 13/06; A63F 13/12; A63F 2300/301; A63F 2300/204; A63F 2300/1075; G06F 1/1626; G06F 3/1423; H40N 21/4781; H40N 21/41407; H40N 21/4126
USPC .......................... 463/1, 30–31, 36–37, 40–43
See application file for complete search history.

(56) References Cited

U.S. PATENT DOCUMENTS 5,393,072 A 2/1995 Best
5,393,073 A 2/1995 Best
(Continued)

FOREIGN PATENT DOCUMENTS

JP 2001-034247 2/2001
JP 2002-530017 9/2002
(Continued)

OTHER PUBLICATIONS

European Search Report issued for corresponding European Patent Application No. 11193797.5 issued Nov. 9, 2012 (6 pages).

*Primary Examiner* — William M Brewster
*Assistant Examiner* — Alex F. R. P. Rada, II
(74) *Attorney, Agent, or Firm* — Nixon & Vanderhye, P.C.

(57) ABSTRACT

A game system has at least two modes of operation, that is, a monitor game mode and a terminal device game mode. In the monitor game mode, a main game image is displayed on a monitor and a sub game image is displayed on an LCD of a terminal device. In the terminal device game mode, the main game image is displayed on the LCD of the terminal device. The mode of operation can be switched in accordance with a mode switching instruction from a user.

19 Claims, 17 Drawing Sheets

(56) References Cited

U.S. PATENT DOCUMENTS

| | | |
|---|---|---|
| 6,328,570 B1 | 12/2001 | Ng |
| 6,500,070 B1 | 12/2002 | Tomizawa et al. |
| 7,115,031 B2 | 10/2006 | Miyamoto et al. |
| 7,762,891 B2 | 7/2010 | Miyamoto et al. |
| 2003/0216177 A1 | 11/2003 | Aonuma et al. |
| 2005/0174489 A1 | 8/2005 | Yokoyama et al. |
| 2006/0038833 A1 | 2/2006 | Mallinson et al. |
| 2006/0263048 A1 | 11/2006 | Sato et al. |
| 2006/0265654 A1 | 11/2006 | Nakamura et al. |
| 2009/0285484 A1 | 11/2009 | Mallinson et al. |
| 2010/0035686 A1 | 2/2010 | Nakashima |
| 2010/0113148 A1 | 5/2010 | Haltovsky et al. |
| 2010/0331082 A1* | 12/2010 | Kim et al. ............... 463/30 |
| 2012/0236210 A1* | 9/2012 | Matsubayashi ............ 348/739 |
| 2012/0287058 A1* | 11/2012 | Lee .............. 345/173 |
| 2012/0309537 A1* | 12/2012 | Nogami et al. ........... 463/39 |
| 2013/0215025 A1* | 8/2013 | NOGAMI et al. ......... 345/157 |

FOREIGN PATENT DOCUMENTS

| | | |
|---|---|---|
| JP | 2003-325973 | 11/2003 |
| JP | 2003-333359 | 11/2003 |
| JP | 2005-318964 | 11/2005 |
| JP | 2006-332811 | 12/2006 |
| JP | 2007-006443 | 1/2007 |
| JP | 2009-536058 | 10/2009 |
| WO | WO 00/28732 | 5/2000 |
| WO | 2005/039719 | 5/2005 |
| WO | 2007/050138 | 5/2007 |
| WO | 2007/095314 | 8/2007 |
| WO | WO 2007/128949 | 11/2007 |

* cited by examiner

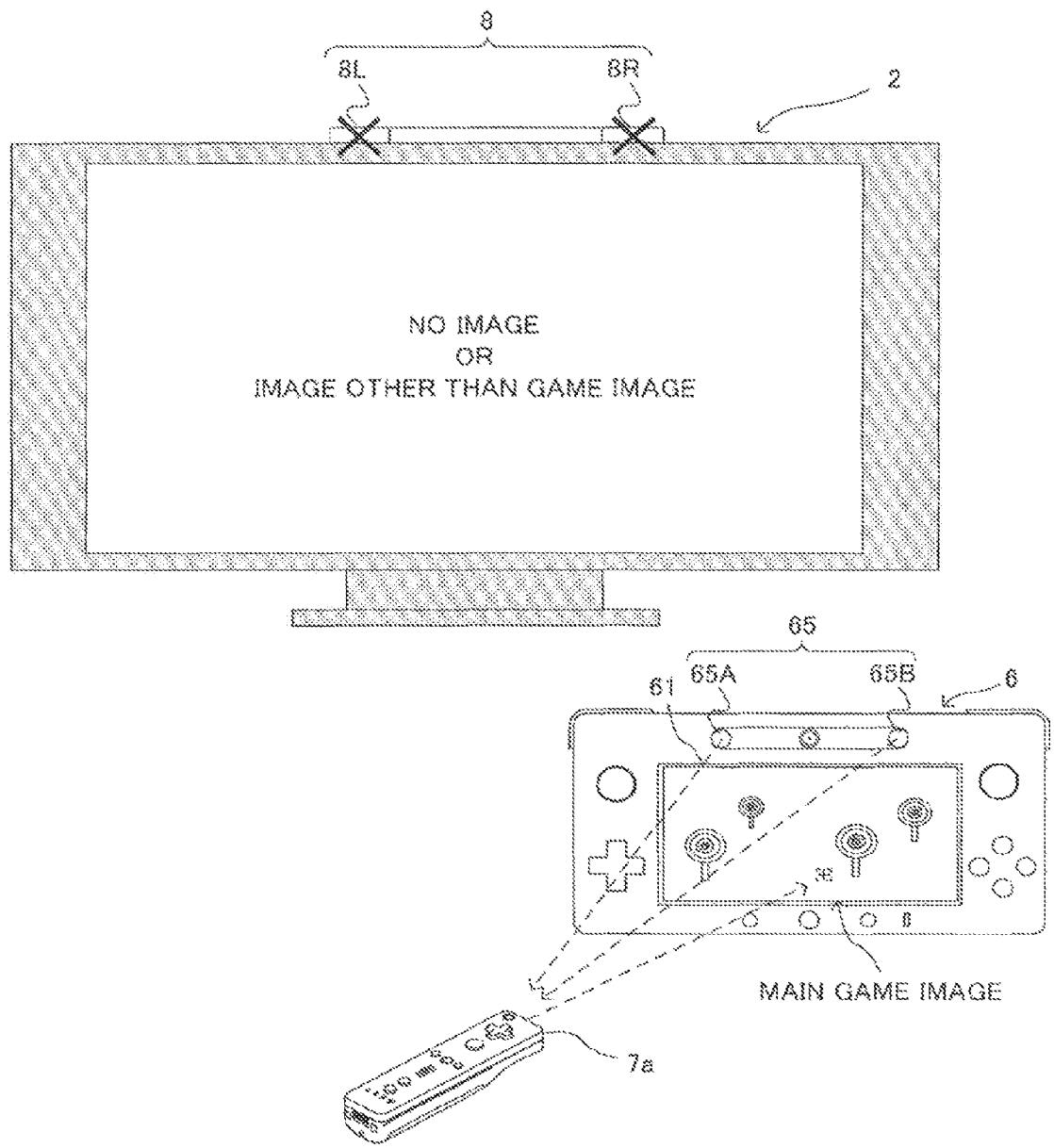

COMPUTER-READABLE STORAGE MEDIUM, INFORMATION PROCESSING APPARATUS, INFORMATION PROCESSING SYSTEM AND INFORMATION PROCESSING METHOD

CROSS REFERENCE TO RELATED APPLICATION

This application is a continuation of U.S. patent Ser. No. 13/325,436, filed on Dec. 14, 2011 which claims priority of Japanese Patent Application No. 2011-125646, filed on Jun. 3, 2011, each of which is incorporated herein by reference.

FIELD

The exemplary embodiment relates to a computer-readable storage medium, an information processing apparatus, an information processing system and an information processing method.

BACKGROUND AND SUMMARY

Conventionally, there have been video game systems in which a video signal from a game apparatus is inputted to a video input terminal of a television receiver via an AV cable and a game image is displayed on a screen of the television receiver.

In a conventional video game system, in order to play a video game (hereinafter, simply referred to as a game), it is necessary to display a game image on a screen of a television receiver. Accordingly, there is a problem that while a user is playing a game, another user is unable to use the television receiver for a use (for example, viewing a television program, viewing video images reproduced by a DVD player) other than the game. Conversely, there is a problem that while a user is using the television receiver for a use other than a game, another user is unable to play the game.

An object of the exemplary embodiment is to provide a computer-readable storage medium, an information processing apparatus, an information processing system and an information processing method which can provide a user with an image even in a situation where a stationary display device such as a television receiver cannot be used.

The above object can be attained by, for example, the following configurations.

A first exemplary configuration is a computer-readable storage medium having stored therein an information processing program which causes a computer of an information processing apparatus capable of outputting an image to a portable display device and a stationary display device to function as a processor, a main image generator, a mode selector, and a display controller.

The processor executes a predetermined information process. The main image generator generates a main image in accordance with the predetermined information process. The mode selector selects a mode of operation from among a plurality of modes of operation including a first mode for displaying the main image on the portable display device and a second mode for displaying the main image on the stationary display device. The display controller (A) outputs the main image to the portable display device in the first mode and (B) outputs the main image to the stationary display device in the second mode.

The information processing program may further cause the computer to function as a mode switching instruction receiver for receiving a mode switching instruction from a user. The mode selector may switch the mode of operation based on the mode switching instruction.

The mode selector switches, when the mode switching instruction is inputted, the mode of operation without temporarily ends the predetermined information process being executed by the processor.

The portable display device may include an operation section. The processor may execute the predetermined information process based on a signal from the operation section of the portable display device at least in the first mode.

The information processing apparatus may include a controller. The processor may (A) execute the predetermined information process based on the signal from the operation section of the portable display device in the first mode and (B) execute the predetermined information process based on a signal from the controller in the second mode.

The main image generator may generate, in accordance with the mode of operation selected by the mode selector, the main image in a format suitable for a display device to which the main image is to be outputted.

The display controller may output the main image to the stationary display device in a general-purpose output format and output the main image to the portable display device in an output format specific to the portable display device.

The information processing program may further cause the computer to function as a sub image generator for generating a sub image in accordance with the predetermined information process, and the display controller may (A) output the main image to the portable display device in the first mode and (B) output the main image and the sub image to the stationary display device and the portable display device, respectively, in the second mode.

The portable display device may include an operation section. The mode selector may be configured to select, in addition to the first mode and the second mode, a stationary display device control mode for remotely controlling the stationary display device by using the operation section of the portable display device. The display controller may output, in the stationary display device control mode, an image for control for controlling the stationary display device to the portable display device.

The processor may suspend, when the first mode or the second mode is switched to the stationary display device control mode, the predetermined information process being executed, and resume, when the stationary display device control mode is switched to the first mode or the second mode, the predetermined information process from a state immediately prior to being suspended.

The portable display device may include a marker having one or more light emitters. The information processing apparatus may include a controller having an imaging section which takes an image of the marker. The information processing program may further cause the computer to function as a designated position calculator for calculating a designated position on the main image designated by a user based on a position of light, from the light emitter, which appears on an image taken by the imaging section. The processor may execute the predetermined information process based on the designated position calculated by the designated position calculator.

The portable display device may include a first marker having one or more light emitters. The stationary display device may have, in the vicinity thereof, a second marker having one or more light emitters. The information processing apparatus may include a controller having an imaging section which takes an image of the first marker and the second marker. The information processing program may further cause the computer to function as: a marker controller for (A) causing only the first marker of the first marker and the second marker to emit light in the first mode and (B) causing only the second marker of the first marker and the second marker to emit light in the second mode; and a designated position calculator for calculating a designated position on the main image designated by a user based on a position of light, from the light emitter, which appears on an image taken by the imaging section. The processor may execute the predetermined information process based on the designated position calculated by the designated position calculator.

The information processing apparatus may include a plurality of controllers. The processor may be configured to execute the predetermined information process based on signals from the plurality of controllers at least in the second mode.

The predetermined information process may be game processing.

The display controller may output the main image to the portable display device via wireless transmission.

The display controller may compress the main image and output the compressed main image to the portable display device.

A second exemplary configuration is an information processing apparatus capable of outputting an image to a portable display device and a stationary display device. The information processing apparatus includes a processor, a main image generator, a mode selector and a display controller.

A third exemplary configuration is an information processing system capable of outputting an image to a portable display device and a stationary display device. The information processing system includes a processor, a main image generator, a mode selector and a display controller.

A fourth exemplary configuration is an information processing method which is executed on an information processing system capable of outputting an image to a portable display device and a stationary display device. The information processing method includes the steps of processing, generating a main image, selecting a mode of operation, and controlling display.

In the step of processing, a predetermined information process is executed. In the step of generating the main image, the main image is generated in accordance with the predetermined information process. In the step of selecting the mode of operation, a mode of operation is selected from among a plurality of modes of operation including a first mode for displaying the main image on the portable display device and a second mode for displaying the main image on the stationary display device. In the step of controlling display, (A) the main image is outputted to the portable display device in the first mode and (B) the main image is outputted to the stationary display device in the second mode.

According to the exemplary embodiment, a user can be provided with an image even in a situation where a stationary display device such as a television receiver cannot be used.

These and other objects, features, aspects and advantages of the exemplary embodiments will become more apparent from the following detailed description when taken in conjunction with the accompanying drawings.

BRIEF DESCRIPTION OF THE DRAWINGS

FIG. 20 is a diagram showing another non-limiting example of the screens of the monitor 2 and the LCD 61 in the terminal device game mode.

DETAILED DESCRIPTION OF NON-LIMITING EXAMPLE EMBODIMENTS

Figure 1:
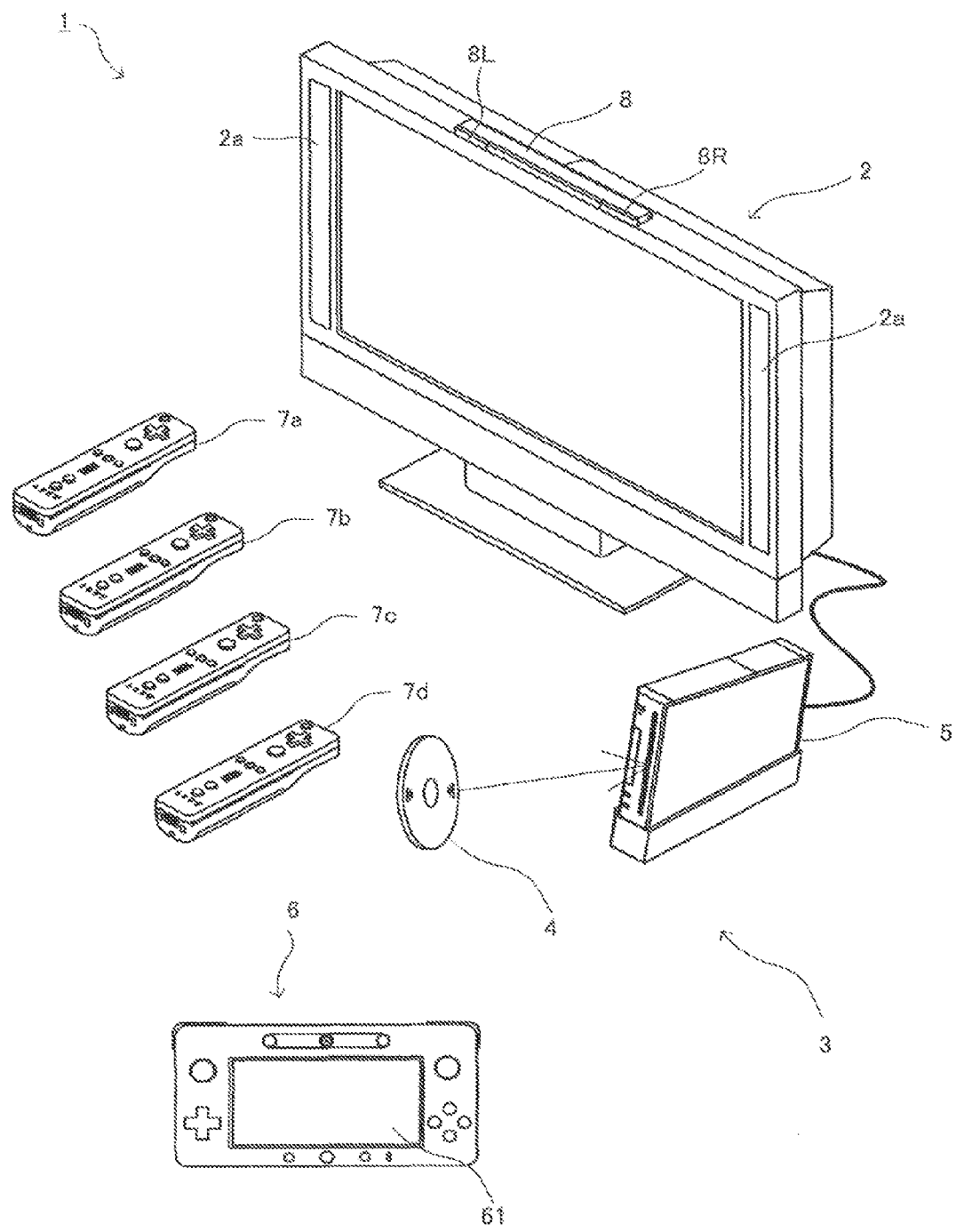
FIG. 1 is an external view showing a non-limiting example of a game system 1 according to an embodiment.

With reference to FIG. 1, a game system according to an embodiment will be described.

In FIG. 1, a game system 1 includes a television receiver for home use (hereinafter, referred to as a monitor) 2 which is an example of a general-purpose stationary display device and a stationary game apparatus 3 connected to the monitor 2 via a connecting cord. The monitor 2 includes loudspeakers 2a. The game apparatus 3 includes an optical disc 4, a game apparatus body 5, a terminal device 6, and controllers 7a to 7d (hereinafter, simply referred to as a controller 7 unless there is need to distinguish the respective controllers 7a to 7d from each other).

The optical disc 4 has stored therein an information processing program (typically, a game program) to be executed by the game apparatus body 5.

The monitor 2 displays a game image outputted from the game apparatus body 5. The monitor 2 includes the loudspeakers 2a which output a game sound outputted from the game apparatus body 5.

The game apparatus body 5 executes game processing and the like based on a game program and the like stored in the optical disc 4.

The controller 7 is provided with a plurality of operation sections (operation buttons). The controller 7 transmits, to the game apparatus body 5, operation data (controller operation data) representing a state of inputs to the respective operation sections (whether the respective operation buttons are pressed) by, for example, using a technology of Bluetooth (registered trademark).

The controller 7 includes an imaging section for taking an image of a marker 8 which includes two LED modules (hereinafter, referred to as "markers") 8L and 8R provided in the vicinity (above a display screen in FIG. 1) of the display screen of the monitor 2, and an imaging information calculation section for calculating positions of the markers within an image taken by the imaging section. The positions of the markers calculated by the imaging information calculation section are transmitted to the game apparatus body 5 as marker coordinate data. In the game apparatus body 5, a movement, a position, an orientation and the like of the controller 7 can be calculated based on the marker coordinate data. Furthermore, a designated position on the screen of the monitor 2 which is designated by a user can be calculated based on the marker coordinate data.

Further, the controller 7 includes an acceleration sensor and a gyro sensor. Acceleration data representing accelerations detected by the acceleration sensor and angular velocity data representing angular velocities detected by the gyro sensor are transmitted to the game apparatus body 5. In the game apparatus body 5, an orientation and a movement of the controller 7 can calculated based on the acceleration data and/or the angular velocity data.

The terminal device 6 is a portable device that is small enough to be held by the user and the user is allowed to move the terminal device 6 with hands, or place the terminal device 6 at any location. Although a specific structure of the terminal device 6 will be described later, the terminal device 6 includes an LCD (Liquid Crystal Display) 61 as display means, and input means (a touch panel 62, a gyro sensor 604, and the like described later). The terminal device 6 and the game apparatus body 5 are communicable with each other wirelessly or via a cable. The terminal device 6 receives, from the game apparatus body 5, data of an image (e.g., a game image) generated in the game apparatus body 5, and displays the image represented by the data on the LCD 61. Although in the exemplary embodiment, an LCD is used as a display device, the terminal device 6 may include any other display device, such as a display device utilizing EL (Electro Luminescence), for example. Further, the terminal device 6 transmits, to the game apparatus body 5, operation data representing the content of an operation performed on the terminal device 6.

Figure 2:
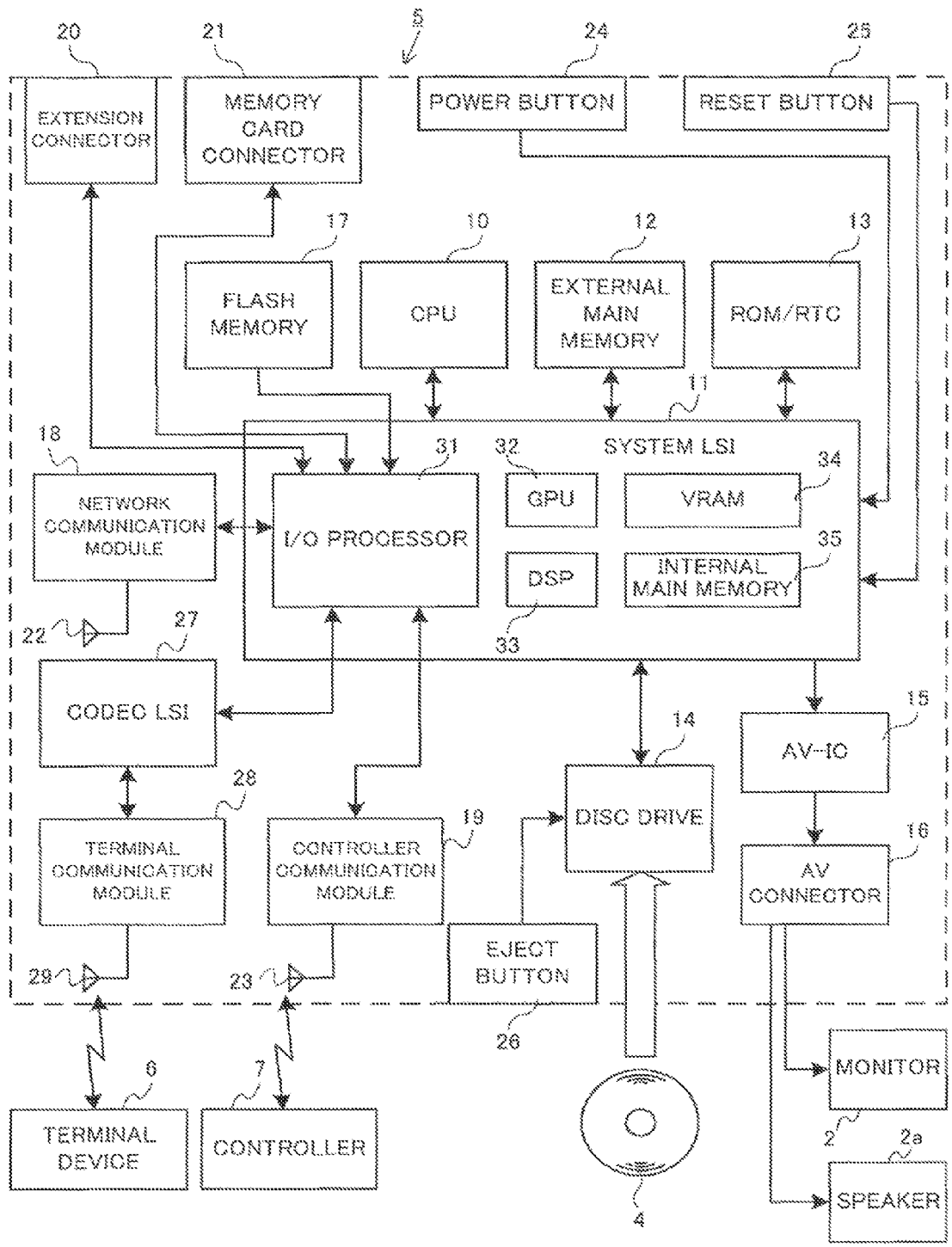
FIG. 2 is a functional block diagram showing a non-limiting example of a game apparatus body 5 shown in FIG. 1.

Next, with reference to FIG. 2, an internal structure of the game apparatus body 5 will be described. FIG. 2 is a block diagram illustrating an example of the internal structure of the game apparatus body 5. The game apparatus body 5 includes a CPU (Central Processing Unit) 10, a system LSI (Large Scale Integration) 11, an external main memory 12, a ROM/RTC (Read Only Memory/Real Time Clock) 13, a disc drive 14, an AV-IC (Audio Video-Integrated Circuit) 15 and the like.

In addition to the CPU 10, the external main memory 12, the ROM/RTC 13, the disc drive 14, and the AV-IC 15 are connected to the system LSI 11. The external main memory 12 which is a volatility memory is used as work area and buffer area for the CPU 10. The ROM/RTC 13 includes a ROM (so-called boot ROM) incorporating a program for booting the game apparatus body 5, and a clock circuit (RTC) for counting time. The disc drive 14 reads, from the optical disc 4, program data, texture data and the like, and writes the read data into an internal main memory 35 or the external main memory 12 described below.

The system LSI 11 includes an input/output processor (I/O processor) 31, a GPU (Graphics Processor Unit) 32, a DSP (Digital Signal Processor) 33, a VRAM (Video RAM) 34, and the internal main memory 35.

The GPU 32 generates an image in accordance with a graphics command (draw command) supplied from the CPU 10. In the exemplary embodiment, the game apparatus body 5 may generate both a game image to be displayed on the monitor 2 and a game image to be displayed on the terminal device 6. Hereinafter, the game image to be displayed on the monitor 2 may be referred to as a "monitor game image", and the game image to be displayed on the terminal device 6 may be referred to as a "terminal game image".

The DSP 33, serving as an audio processor, generates sound data by using sound data and sound waveform (tone quality) data stored in the internal main memory 35 and the external main memory 12. In the exemplary embodiment, similarly to the game images, both a game sound to be outputted from the loudspeakers 2a of the monitor 2 and a game sound to be outputted from the loudspeakers of the terminal device 6 may be generated. Hereinafter, the game sound to be outputted from the monitor 2 may be referred to as a "monitor game sound", and the game sound to be outputted from the terminal device 6 may be referred to as a "terminal game sound".

Among the image data and sound data generated by the game apparatus body 5, the image data and sound data to be outputted to the monitor 2 are read by the AV-IC 15. Via an AV connector 16, the AV-IC 15 outputs the read image data to the monitor 2, and outputs the read sound data to the loudspeakers 2a included in the monitor 2. Thereby, an image is displayed on the monitor 2, and a sound is outputted from the loudspeakers 2a.

Further, among the image data and sound data generated by the game apparatus body 5, the image data and sound data to be outputted to the terminal device 6 are transmitted to the terminal device 6 by the I/O processor 31 or the like. Data transmission to the terminal device 6 by the I/O processor 31 or the like will be described later.

The I/O processor 31 executes data reception and transmission with the components connected thereto, and download of data from an external apparatus. The I/O processor 31 is connected to a flash memory 17, a network communication module 18, a controller communication module 19, an extension connector 20, a memory card connector 21, and a codec LSI 27. The codec LSI 27 is connected to the terminal communication module 28.

The game apparatus body 5 is connected to a network such as the Internet so as to communicate with external information processing apparatuses (for example, other game apparatuses or various servers). That is, the I/O processor 31 is connected to a network via the network communication module 18 and an antenna 22 so as to communicate with external information processing apparatuses connected to the network. The flash memory 17 may store not only the data transmitted and received between the game apparatus body 5 and the external information processing apparatuses, but also saved data (result data or progress data of the process) of the game played with the game apparatus body 5. Further, the flash memory 17 may store programs such as a game program.

The game apparatus body 5 can receive operation data from the controller 7. That is, the I/O processor 31 receives, via the antenna 23 and the controller communication module 19, operation data or the like transmitted from the controller 7, and stores (temporarily) the data in a buffer region of the internal main memory 35 or the external main memory 12.

The game apparatus body 5 is capable of transmitting/receiving image data, sound data and the like to/from the terminal device 6. The I/O processor 31 outputs data of a game image (game image for terminal) generated by the GPU 32 to the codec LSI 27. The codec LSI 27 performs a predetermined compression process on the image data supplied from the I/O processor 31. The terminal communication module 28 performs wireless communication with the terminal device 6. Accordingly, the image data compressed by the codec LSI 27 is transmitted by the terminal communication module 28 to the terminal device 6 via the antenna 29. In the exemplary embodiment, the codec LSI 27 compresses the image data by using a highly efficient compression technique, for example, the H.264 standard. The codec LSI 27 may adopt other compression techniques. When the communication rate is sufficiently high, uncompressed image data may be transmitted. The terminal communication module 28 is, for example, a Wi-Fi certified communication module. The terminal communication module 28 may perform wireless communication with the terminal device 6 at a high speed by using, for example, the technique of MIMO (Multiple Input Multiple Output) adopted in the IEEE802.11n standard, or may use other communication techniques.

The game apparatus body 5 transmits, to the terminal device 6, sound data as well as the image data. That is, the I/O processor 31 outputs sound data (game sound for terminal) generated by the DSP 33 to the terminal communication module 28 via the codec LSI 27. The codec LSI 27 performs a compression process on the sound data in a similar manner to that for the image data. Any compression technique may be adopted for the sound data. In another embodiment, uncompressed sound data may be transmitted. The terminal communication module 28 transmits the compressed image data and sound data to the terminal device 6 via the antenna 29.

The game apparatus body 5 transmits, in addition to the image data and sound data, various control data to the terminal device 6 according to need. The control data represents control instructions for the components included in the terminal device 6, such as an instruction to control on/off of a marker section (a marker section 65 shown in FIG. 5), and an instruction to control image taking of a camera (a camera 66 shown in FIG. 5). The I/O processor 31 transmits the control data to the terminal device 6 in response to an instruction from the CPU 10.

The game apparatus body 5 can receive various data from the terminal device 6. Although details will be described later, in the exemplary embodiment, the terminal device 6 transmits operation data, image data, and sound data. The respective data transmitted from the terminal device 6 are received by the terminal communication module 28 via the antenna 29. The image data and sound data transmitted from the terminal device 6 have been subjected to a similar compression process to that for the image data and sound data transmitted from the game apparatus body 5 to the terminal device 6. Accordingly, these image data and sound data are transmitted from the terminal communication module 28 to the codec LSI 27, and subjected to a decompression process by the codec LSI 27. The decompressed data are outputted to the I/O processor 31. The operation data, which has been received by the terminal communication module 28, is outputted to the I/O processor 31 via the codec LSI 27. The I/O processor 31 stores (temporarily) the data received from the terminal device 6 in the buffer region of the internal main memory 35 or the external main memory 12.

The game apparatus body 5 is connectable to other devices and external storage media via the extension connector 20 or the memory card connector 21.

The game apparatus body 5 includes (on the front main surface thereof, for example) a power button 24, a reset button 25, an insertion slot in which the optical disc 4 is inserted, an eject button 26 for ejecting the optical disc 4 from the insertion slot of the game apparatus body 5, and the like.

In another embodiment, some of the components of the game apparatus body 5 may be constituted as an extension device separated from the game apparatus body 5. At this time, the extension device may be connected to the game apparatus body 5 via the extension connector 20. Specifically, the extension device may include, for example, the codec LSI 27, the terminal communication module 28, and the antenna 29, and may be detachably connected to the extension connector 20. Thus, by connecting the extension device to the game apparatus body which does not have the above-mentioned components, the game apparatus body can be made communicable with the terminal device 6.

Figure 3:
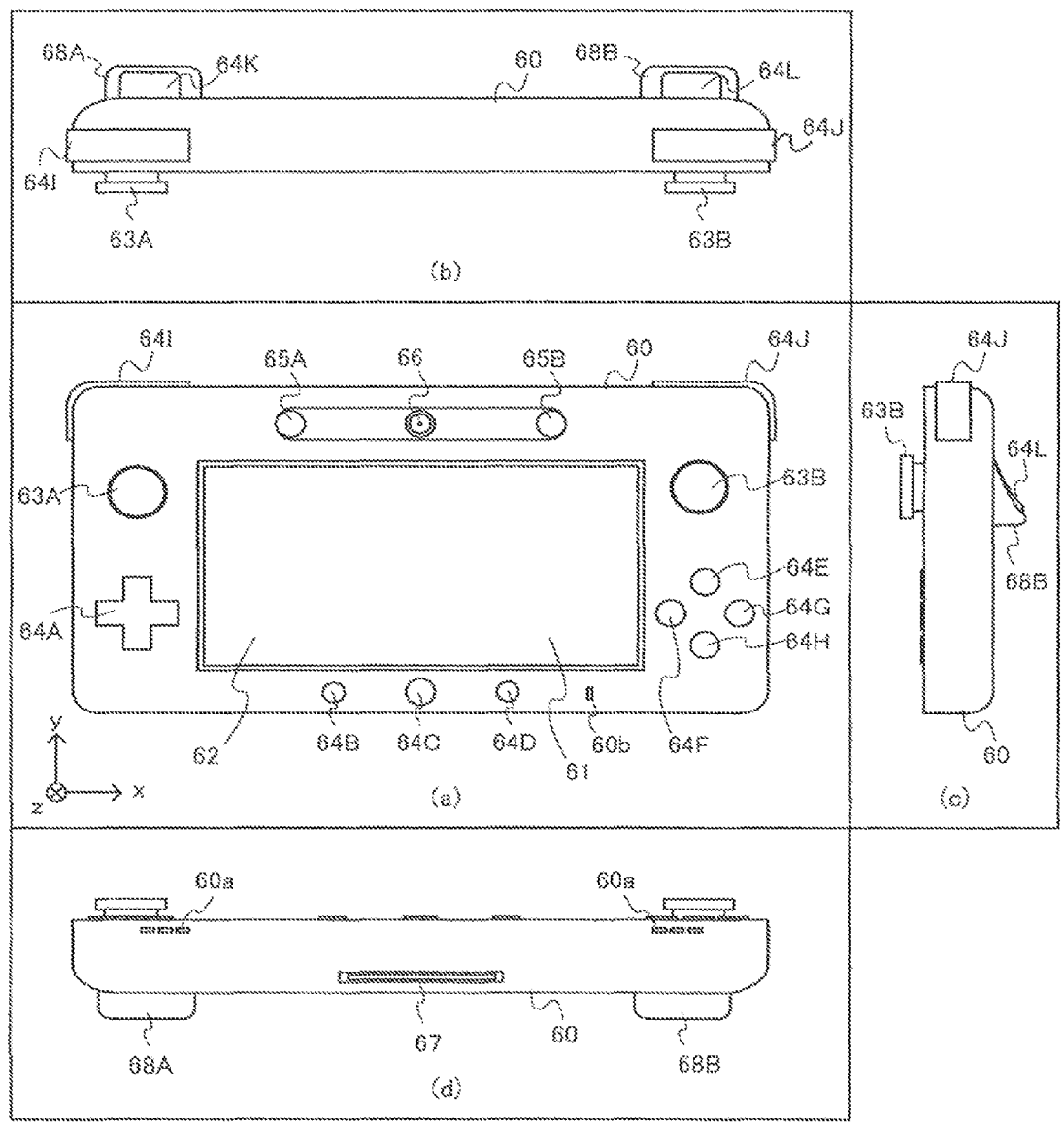
FIG. 3 is a diagram showing a non-limiting example of an external structure of a terminal device 6 shown in FIG. 1.
Figure 4:
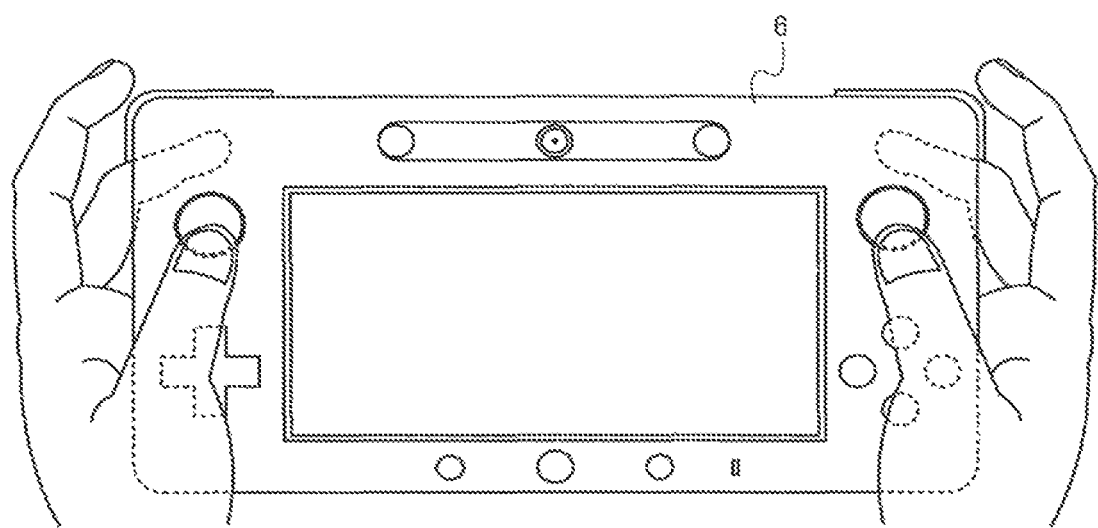
FIG. 4 is diagram showing a non-limiting example of a state where a user holds the terminal device 6.

Next, a structure of the terminal device 6 will be described with reference to FIGS. 3 to 5. FIG. 3 is a diagram illustrating an example of an external structure of the terminal device 6. More specifically, (a) of FIG. 3 is a front view of the terminal device 6, (b) of FIG. 3 is a top view, (c) of FIG. 3 is a right side view, and (d) of FIG. 3 is a bottom view. FIG. 4 shows an example of a state in which a user holds the terminal device 6 with both hands.

As shown in FIG. 3, the terminal device 6 includes a housing 60 which generally has a horizontally long plate-like rectangular shape. The housing 60 is small enough to be held by the user.

The terminal device 6 includes the LCD 61 on a front surface of the housing 60. The LCD 61 is provided near the center of the front surface of the housing 60. Therefore, as shown in FIG. 4, the user, holding the housing 60 at portions to the right and left of the LCD 61, is allowed to move the terminal device 6 while viewing a screen of the LCD 61.

As shown in (a) of FIG. 3, the terminal device 6 includes, as operation means, a touch panel 62 on the screen of the LCD 61. In the exemplary embodiment, the touch panel 62 is, but is not limited to, a resistive film type touch panel, and any type of touch panel such as electrostatic capacitance type, may be used. The touch panel 62 may be of single touch type or multiple touch type. In the exemplary embodiment, the touch panel 62 has the same resolution (detection accuracy) as that of the LCD 61. However, the resolution of the touch panel 62 and the resolution of the LCD 61 need not be the same. Since the terminal device 6 has the touch panel 62, the user is allowed to operate the touch panel 62 while moving the terminal device 6. That is, the user is allowed to directly (by using the touch panel 62) perform an input onto the screen of the LCD 61 while moving the LCD 61.

As shown in FIG. 3, the terminal device 6 has, as operation means, two analog sticks 63A and 63B, and a plurality of operation buttons 64A to 64L. The analog sticks 63A and 63B are each a device for designating a direction. The analog sticks 63A and 63B are each configured such that a stick part thereof to be operated by a finger of the user is slidable or tiltable in any direction (at any angle in any direction such as the upward, the downward, the rightward, the leftward, or the diagonal direction) with respect to the front surface of the housing 60.

The respective operation buttons 64A to 64L are assigned functions, according to need, in accordance with a game program. For example, the cross button 64A may be used for direction designation operation, selection operation, and the like, and the operation buttons 64E to 64H may be used for determination operation, cancellation operation, and the like.

As shown in (a) of FIG. 3, the terminal device 6 includes a marker section (a marker section 65 shown in FIG. 5) including a marker 65A and a marker 65B, on the front surface of the housing 60. The markers 65A and 65B are each constituted by one or more infrared LEDs. The marker section 65 is used, like the marker 8, for causing the game apparatus body 5 to calculate a movement or the like of the controller 7 with respect to the marker section 65, a designated position on the screen of the LCD 61 designated by the user, and the like. The game apparatus body 5 is capable of controlling the infrared LEDs of the marker section 65 to be on or off.

The terminal device 6 includes the camera 66. The camera 66 is provided on the front surface of the housing 60. Accordingly, the camera 66 is capable of taking an image of the face of the user holding the terminal device 6. For example, the camera 66 is capable of taking an image of the user who is playing a game while viewing the LCD 61.

The terminal device 6 has a microphone (a microphone 609 shown in FIG. 5) as sound input means. The microphone 609 is embedded in the housing 60 at a position inside a microphone hole 60b. The microphone 609 detects for a sound, such as user's voice, around the terminal device 6.

Figure 5:
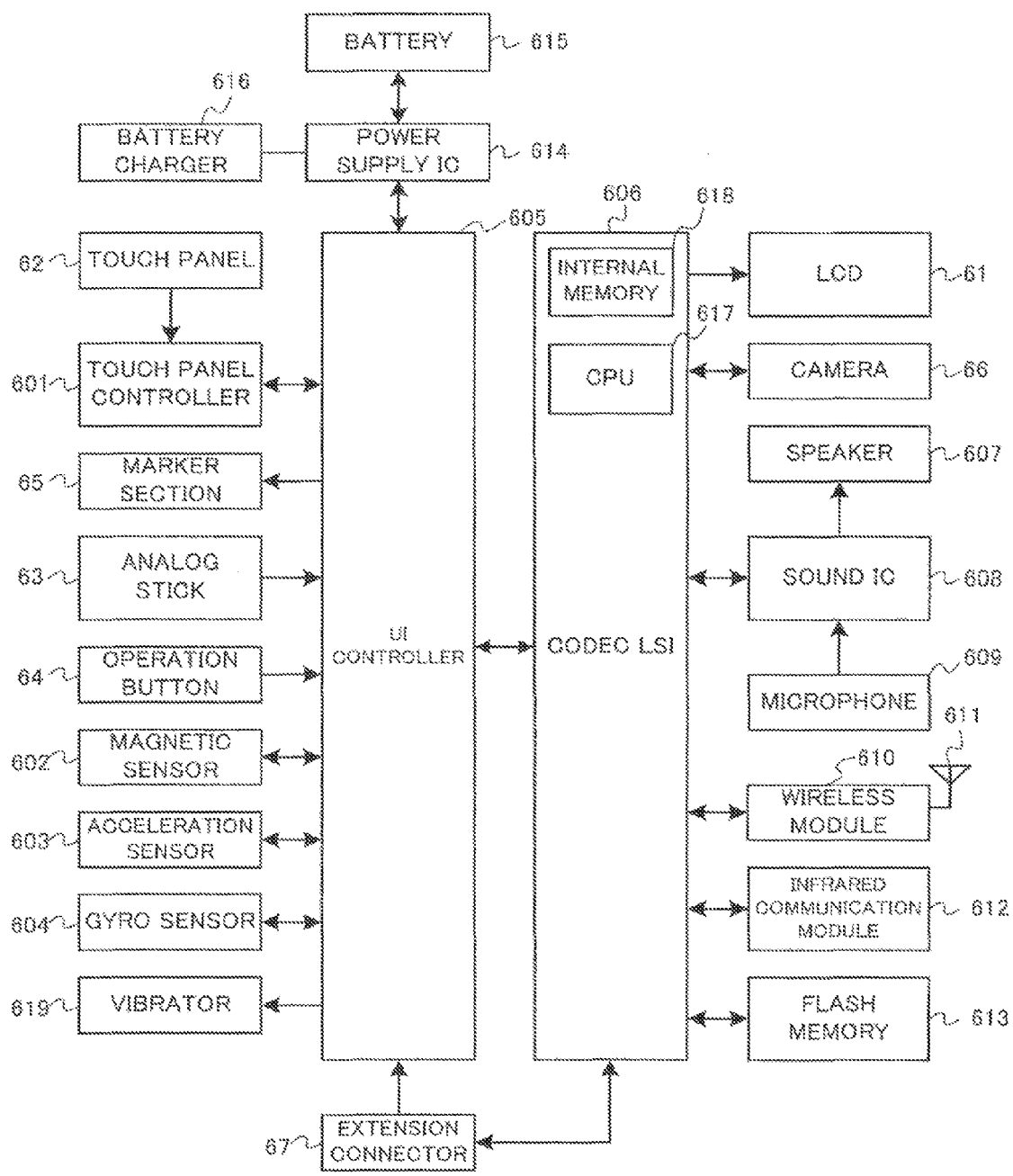
FIG. 5 is a block diagram showing a non-limiting example of an internal structure of the terminal device 6 shown in FIG. 3.

The terminal device 6 has loudspeakers (loudspeakers 607 shown in FIG. 5). A sound is outputted through the speaker holes 60a from the loudspeakers 607 provided in the lower side surface of the housing 60.

The terminal device 6 includes an extension connector 67 for connecting another device to the terminal device 6.

In the terminal device 6 shown in FIG. 3, the shapes of the operation buttons and the housing 60, the number of the respective components, and the positions in which the components are provided are merely examples. The shapes, numbers, and positions may be different from those described above.

Next, an internal structure of the terminal device 6 will be described with reference to FIG. 5 FIG. 5 is a block diagram illustrating an example of the internal structure of the terminal device 6. As shown in FIG. 5, the terminal device 6 includes, in addition to the components shown in FIG. 3, a touch panel controller 601, a magnetic sensor 602, an acceleration sensor 603, the gyro sensor 604, a user interface controller (UI controller) 605, a codec LSI 606, the loudspeakers 607, a sound IC 608, the microphone 609, a wireless module 610, an antenna 611, an infrared communication module 612, a flash memory 613, a power supply IC 614, a battery 615, and a vibrator 619. These electronic components are mounted on an electronic circuit board and accommodated in the housing 60.

The UI controller 605 is a circuit for controlling data inputted to various input/output sections and data output from various input/output sections. The UI controller 605 is connected to the touch panel controller 601, the analog stick 63 (the analog sticks 63A and 63B), the operation button 64 (the operation buttons 64A to 64L), the marker section 65, the magnetic sensor 602, the acceleration sensor 603, the gyro sensor 604, and the vibrator 619. Further, the UI controller 605 is connected to the codec LSI 606 and the extension connector 67. The power supply IC 614 is connected to the UI controller 605, so that power is supplied to the respective components through the UI controller 605. The internal battery 615 is connected to the power supply IC 614, so that power is supplied from the battery 615. Further, a battery charger 616 or a cable, which is supplied with power from an external power supply, may be connected to the power supply IC 614 via a connector or the like. In this case, the terminal device 6 can be supplied with power and charged from the external power supply by using the battery charger 616 or the cable.

The touch panel controller 601 is a circuit which is connected to the touch panel 62 and controls the touch panel 62. The touch panel controller 601 generates a predetermined form of touch position data, based on a signal from the touch panel 62, and outputs the touch position data to the UI controller 605. The touch position data represents coordinates of a position at which an input is performed on an input surface of the touch panel 62. The touch panel controller 601 reads a signal from the touch panel 62 and generates touch position data every predetermined period of time. Further, various control instructions are outputted from the UI controller 605 to the touch panel controller 601.

The analog stick 63 outputs, to the UI controller 605, stick data representing a direction in which the stick part slides (or tilts), and an amount of the sliding (tilting). The operation button 64 outputs, to the UI controller 605, operation button data representing an input state of each of the operation buttons 64A to 64L (whether or not the operation button is pressed).

The magnetic sensor 602 detects the magnitude and direction of a magnetic field to detect an orientation. Orientation data representing the detected orientation is outputted to the UI controller 605. The UI controller 605 outputs, to the magnetic sensor 602, a control instruction for the magnetic sensor 602. Examples of the magnetic sensor 602 include: an MI (Magnetic Impedance) sensor, a fluxgate sensor, a Hall sensor, a GMR (Giant Magneto Resistance) sensor, a TMR (Tunneling Magneto Resistance) sensor, and an AMR (Anisotropic Magneto Resistance) sensor. However, any sensor may be adopted as long as the sensor can detect an orientation.

The acceleration sensor 603 is provided inside the housing 60. The acceleration sensor 603 detects the respective magnitudes of linear accelerations along three axial directions (xyz axial directions shown in (a) of FIG. 3). Acceleration data representing the detected accelerations is outputted to the UI controller 605. The UI controller 605 outputs, to the acceleration sensor 603, a control instruction for the acceleration sensor 603.

The gyro sensor 604 is provided inside the housing 60. The gyro sensor 604 detects the respective angular velocities around the three axes (the above-described xyz axes). Angular velocity data representing the detected angular velocities is outputted to the UI controller 605. The UI controller 605 outputs, to the gyro sensor 604, a control instruction for the gyro sensor 604.

The vibrator 619 is, for example, a vibration motor or a solenoid. The terminal device 6 is vibrated by actuating the vibrator 619 in accordance with a control instruction outputted from the UI controller 605 to the vibrator 619.

The UI controller 605 outputs, to the codec LSI 606, the operation data (hereinafter referred to as terminal operation data) including the touch position data, the stick data, the operation button data, the orientation data, the acceleration data, and the angular velocity data, which have been received from the respective components.

The codec LSI 606 is a circuit for performing a compression process on data to be transmitted to the game apparatus body 5, and a decompression process on data transmitted from the game apparatus body 5. The LCD 61, the camera 66, the sound IC 608, the wireless module 610, the flash memory 613, and the infrared communication module 612 are connected to the codec LSI 606. The codec LSI 606 includes a CPU 617 and an internal memory 618. Although the terminal device 6 is configured not to perform a game process, the terminal device 6 may execute a program for managing the terminal device 6 or a program for communication. For example, a program stored in the flash memory 613 is loaded into the internal memory 618 and executed by the CPU 617 when the terminal device 6 is powered on, thereby starting up the terminal device 6. A part of the area of the internal memory 618 is used as a VRAM for the LCD 61.

The camera 66 takes an image in accordance with an instruction from the game apparatus body 5, and outputs data of the taken image to the codec LSI 606. The codec LSI 606 outputs, to the camera 66, a control instruction for the camera 66, such as an instruction to take an image. The camera 66 is also capable of taking a moving picture. That is, the camera 66 is capable of repeatedly performing image taking, and repeatedly outputting image data to the codec LSI 606.

The sound IC 608 is a circuit for controlling input of sound data from the microphone 609 to the codec LSI 606 and output of sound data from the codec LSI 606 to the loudspeakers 607.

The codec LSI 606 transmits the image data from the camera 66, the sound data from the microphone 609, and the terminal operation data from the UI controller 605, to the game apparatus body 5 through the wireless module 610. In the exemplary embodiment, the codec LSI 606 subjects the image data and the sound data to a compression process similar to that performed by the codec LSI 27. The compressed image data and sound data, and the terminal operation data are outputted to the wireless module 610 as transmission data. The antenna 611 is connected to the wireless module 610, and the wireless module 610 transmits the transmission data to the game apparatus body 5 through the antenna 611. The wireless module 610 has the same function as the terminal communication module 28 of the game apparatus body 5. That is, the wireless module 610 has a function of connecting to a wireless LAN by a method based on, for example, the IEEE802.11n standard.

As described above, the transmission data transmitted from the terminal device 6 to the game apparatus body 5 includes the terminal operation data, the image data, and the sound data. If another device is connected to the terminal device 6 through the extension connector 67, data received from the other device may be included in the transmission data. The infrared communication module 612 performs, with another device, infrared communication based on, for example, the IRDA standard. The codec LSI 606 may include, in the transmission data, data received by the infrared communication, and transmit the transmission data to the game apparatus body 5, according to need.

As described above, the compressed image data and sound data are transmitted from the game apparatus body 5 to the terminal device 6. These data are received by the codec LSI 606 through the antenna 611 and the wireless module 610. The codec LSI 606 decompresses the received image data and sound data. The decompressed image data is outputted to the LCD 61, and an image according to the image data is displayed on the LCD 61. Meanwhile, the decompressed sound data is outputted to the sound IC 608, and a sound based on the sound data is outputted from the loudspeakers 607.

When control data is included in the data received from the game apparatus body 5, the codec LSI 606 and the UI controller 605 provide control instructions for the respective components, according to the control data. As described above, the control data represents control instructions for the respective components (in the exemplary embodiment, the camera 66, the touch panel controller 601, the marker section 65, the sensors 602 to 604, the vibrator 619, and the infrared communication module 612) included in the terminal device 6. In the exemplary embodiment, the control instructions represented by the control data are considered to be instructions to start and halt (stop) the operations of the above-mentioned components. That is, some components which are not used for a game may be halted to reduce power consumption. In this case, data from the halted components are not included in the transmission data transmitted from the terminal device 6 to the game apparatus body 5.

Next, an outline of the operation of the game system 1 of the exemplary embodiment will be described with reference to FIGS. 6 to 14.

The game system 1 of the exemplary embodiment has three modes of operation, that is, a monitor game mode, a terminal device game mode and a monitor control mode.

The monitor game mode is a mode of operation in which a user plays a game while mainly viewing the monitor 2. The terminal device game mode is a mode of operation in which a user plays a game while viewing the screen of the LCD 61 of the terminal device 6. The monitor control mode is a mode of operation in which a user remotely controls the monitor 2 by using the terminal device 6.

A user can switch between these three modes of operation before starting a game play and in a middle of the game play as appropriate.

Figure 6:
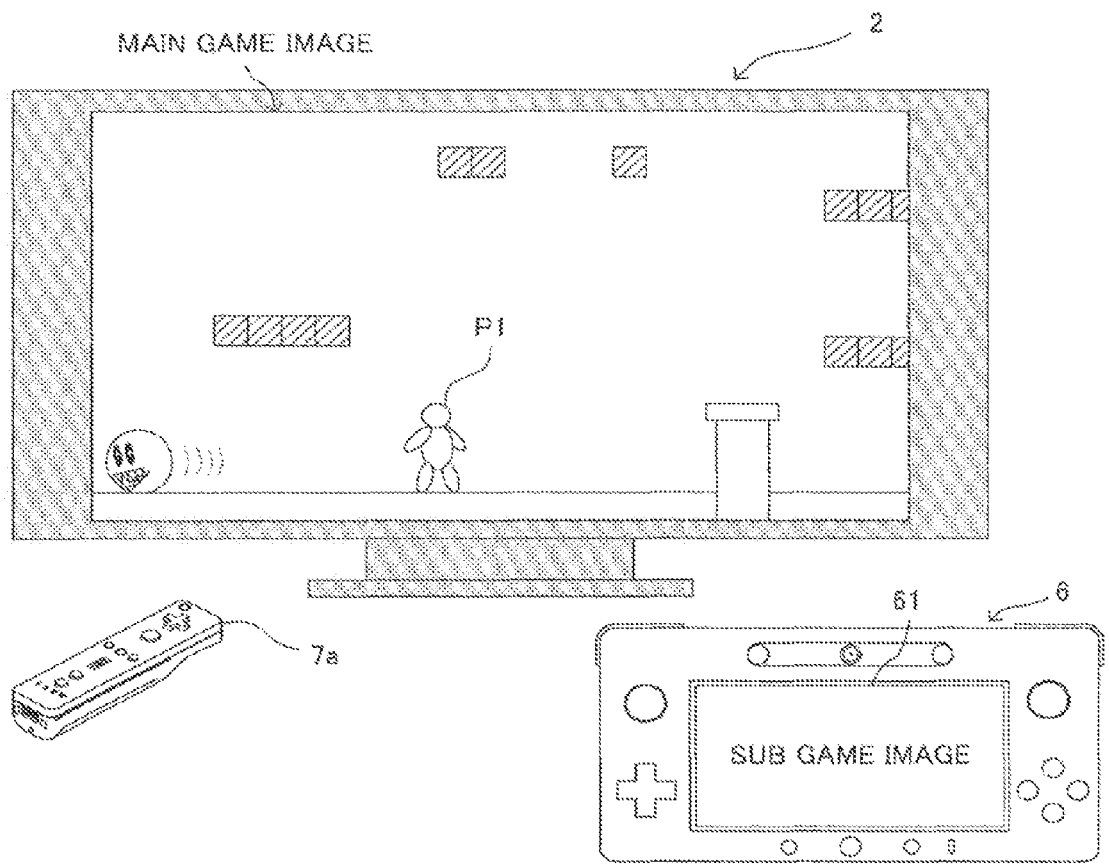
FIG. 6 is a diagram showing a non-limiting example of screens of a monitor 2 and an LCD 61 in a monitor game mode.
Figure 7:
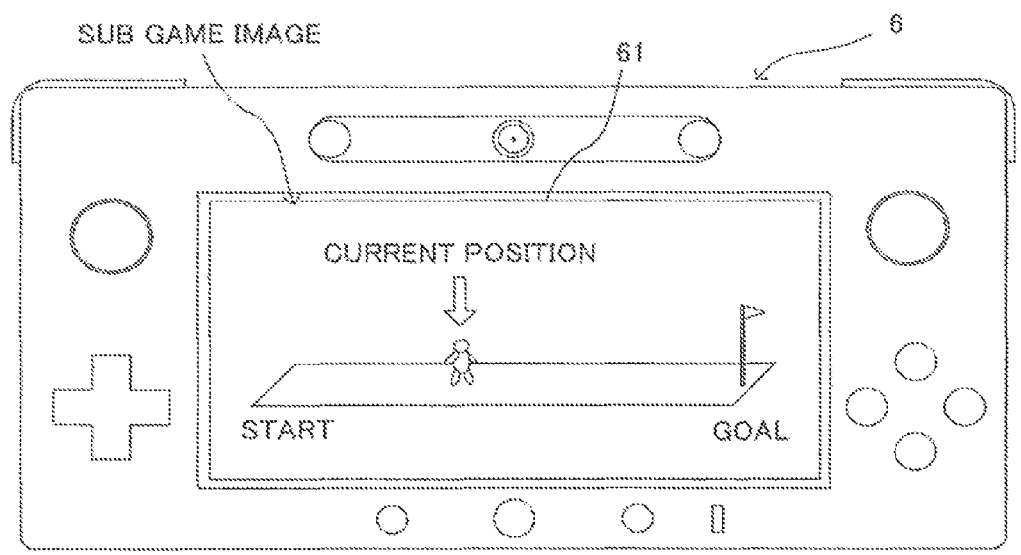
FIG. 7 shows a non-limiting example of a sub game image displayed on the LCD 61.
Figure 8:
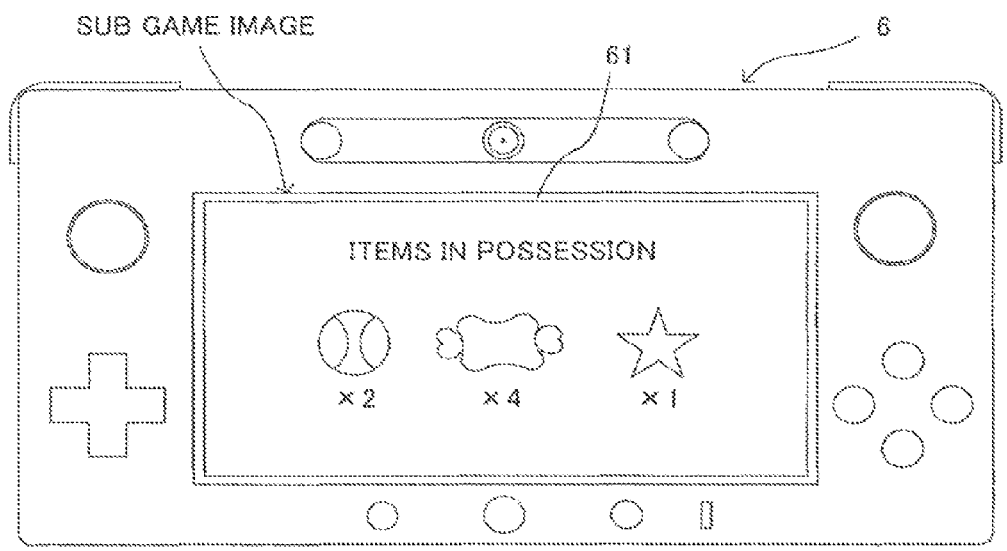
FIG. 8 shows another non-limiting example of the sub game image displayed on the LCD 61.

In the monitor game mode, as shown in FIG. 6, a main game image is displayed on the monitor 2 and a sub game image is displayed on the LCD 61.

The main game image is an image essential for playing a game. In an example of FIG. 6, a part of a game world is displayed on the main game image and a player character P1 operated by a user is included in the game world. The user operates the player character P1 by using the controller 7a while viewing the main game image.

The sub game image is not essential for playing a game but is an image that provides information useful for a user. The sub game image may be, for example, an image showing a current position of a player character in the entire game world as in FIG. 7. Alternatively, the sub game image may be, an image showing items possessed by the player character as in FIG. 8.

The terminal device 6 can be placed at such a position that a user can view the screen of the LCD 61 while playing a game. Accordingly, the user can view the sub game image displayed on the LCD 61 when needed while playing a game.

Figure 9:
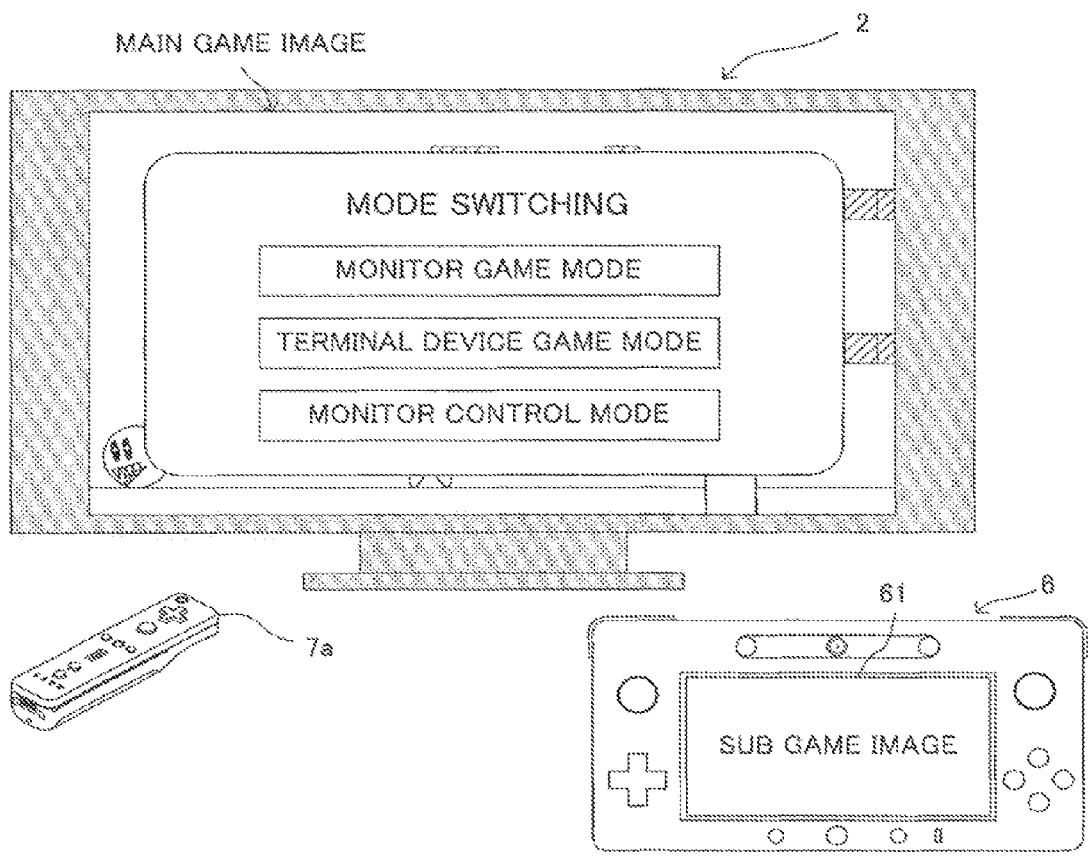
FIG. 9 shows a non-limiting example of an image for mode switching displayed on the monitor 2.
Figure 10:
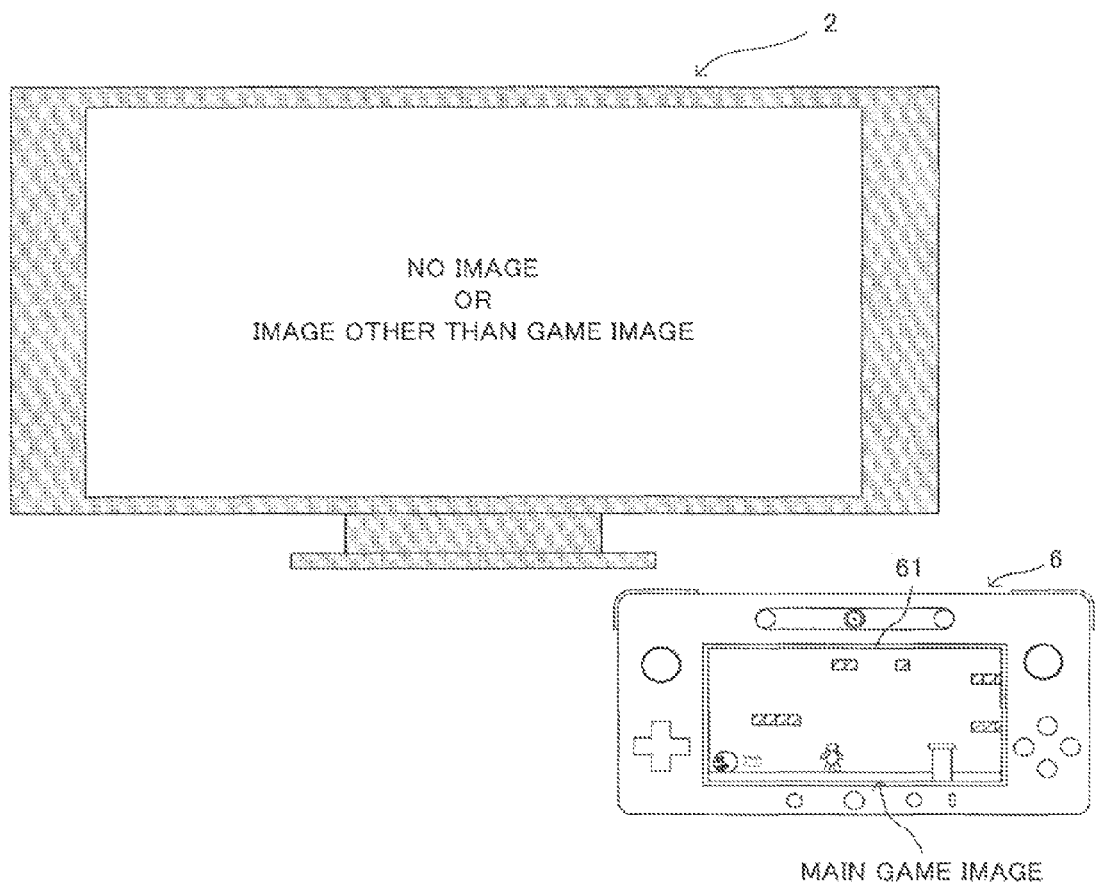
FIG. 10 is a diagram showing a non-limiting example of screens of the monitor 2 and the LCD 61 in a terminal device game mode.

While a user is playing a game in the monitor game mode, the user can switch the mode of operation from the monitor game mode to another mode (the terminal device game mode or the monitor control mode) of operation when needed. Switching the mode of operation can be performed by, for example, pressing a predetermined button of the controller 7a to call an image for mode switching as shown in FIG. 9 and selecting a desired mode of operation. It should be noted that the game is paused while the image for mode switching is displayed.

A case in which the monitor game mode needs to be switched to the terminal device game mode is when, for example, a user other than a user who is playing a game desires to watch a television program on the monitor 2.

In FIG. 9, if the user selects "the terminal device game mode," the mode of operation of the game system 1 is changed to the terminal device game mode. In the terminal device game mode, as in FIG. 10, no game image is displayed on the monitor 2 and the main game image is displayed on the LCD 61 of the terminal device 6.

In the terminal device game mode, the user cannot view the sub game image but is allowed to play a game (that is, control the player character P1) by operating the terminal device 6 instead of the controller 7 while viewing the main game image displayed on the LCD 61.

Even when the mode of operation is switched from the monitor game mode to the terminal device game mode, the user need not temporarily end the game which the user is playing in the monitor game mode and can continue the game in the terminal device game mode.

In the terminal device game mode, no game image is displayed on the monitor 2 and thus the monitor 2 can be used for a use other than a game. For example, a user other than the user who is playing a game can view a television program or view video images reproduced by a DVD player.

Figure 11:
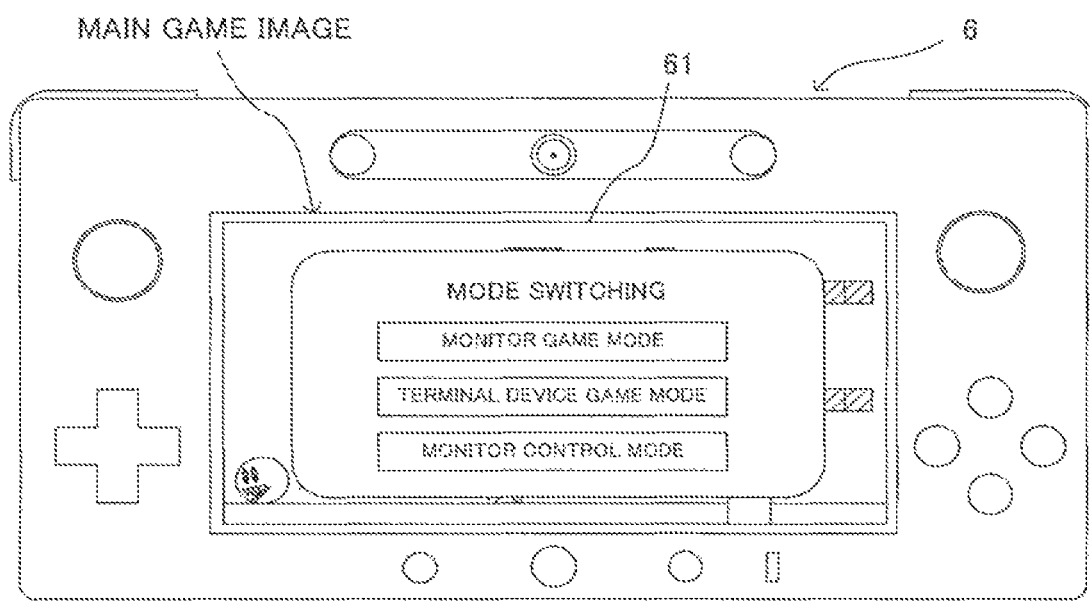
FIG. 11 shows a non-limiting example of an image for mode switching displayed on the LCD 61.
Figure 12:
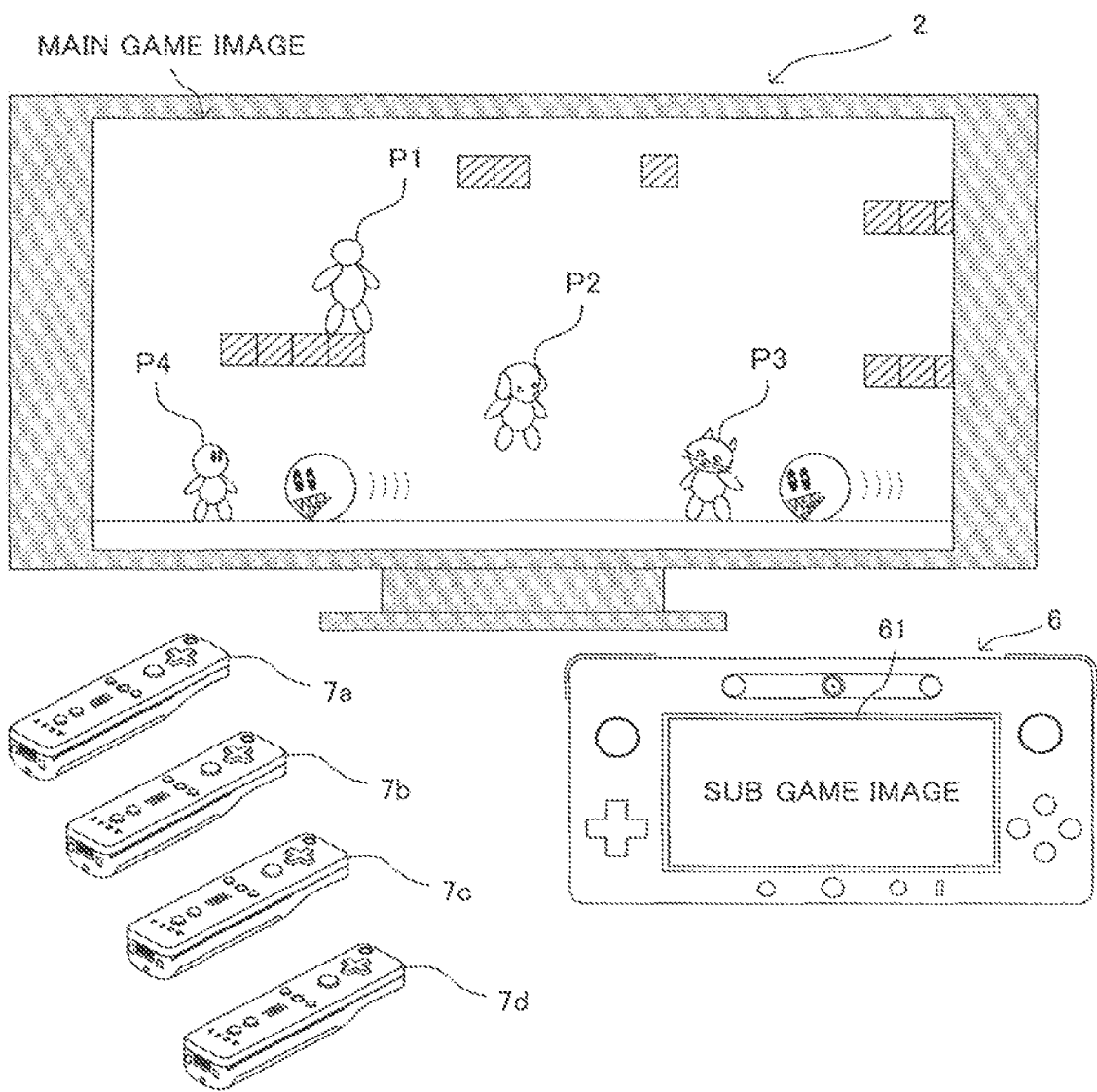
FIG. 12 is a diagram showing another non-limiting example of the screens of the monitor 2 and the LCD 61 in the monitor game mode.
Figure 13:
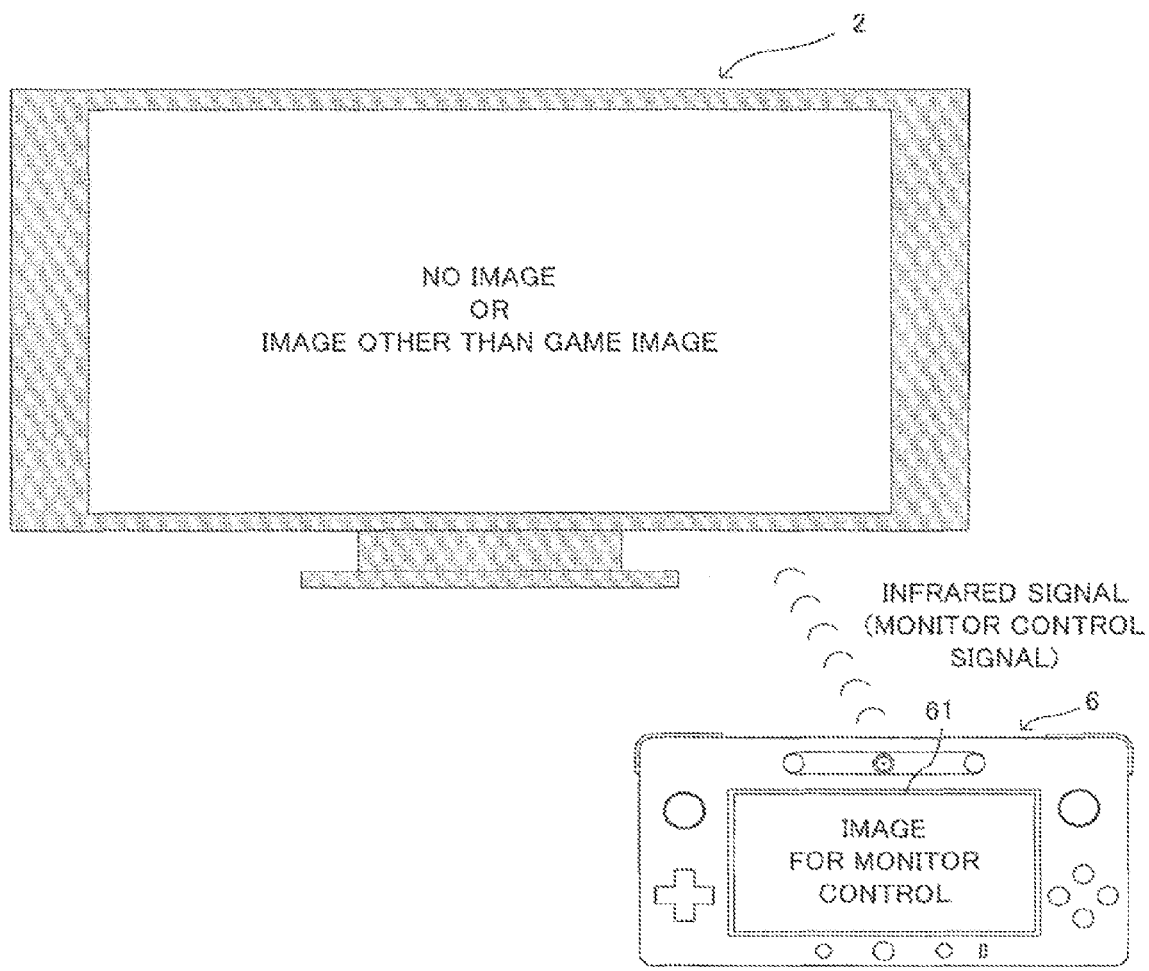
FIG. 13 is a diagram showing a non-limiting example of screens of the monitor 2 and the LCD 61 in a monitor control mode.

While a user is playing a game in the terminal device game mode, the user can switch the mode of operation from the terminal device game mode to another mode (the monitor game mode or the monitor control mode) of operation when needed. Switching the mode of operation can be performed by, for example, pressing a predetermined button of the terminal device 6 to call an image for mode switching as shown in FIG. 11 and selecting a desired mode of operation. It should be noted that the game is paused while an image for mode switching is displayed.

A case in which the terminal device game mode needs to be switched to the monitor game mode is when, for example, a user desires to play a game using a screen larger than the LCD 61. Specifically, when a plurality of users play a game together in such a case where a user other than the user who is playing the game participates in the game, it is preferable that the main game image is displayed on the monitor 2 instead of the LCD 61.

In FIG. 11, if the user selects "the monitor game mode," the mode of operation of the game system 1 is changed to the monitor game mode. In the monitor game mode, as described above, the main game image is displayed on the monitor 2 while the sub game image is displayed on the LCD 61. In an example of FIG. 12, three new users participate in a game, and four users operate controllers 7a to 7d and thereby control player characters P1 to P4, respectively.

It should be noted that, in the image for mode switching as shown in FIG. 9 or FIG. 11, when the user selects "the monitor control mode," the mode of operation of the game system 1 is changed to the monitor control mode while the game is being paused. In the monitor control mode as in FIG. 13, a game image is not displayed on either the monitor 2 or the LCD 61 and an image for monitor control is displayed on the LCD 61.

Figure 14:
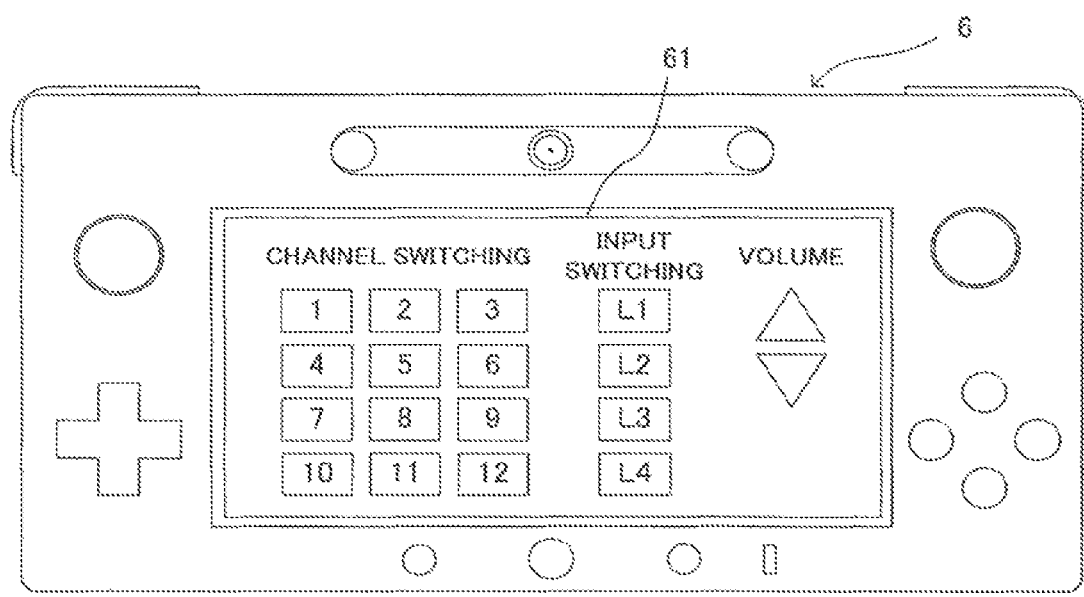
FIG. 14 shows a non-limiting example of an image for monitor control displayed on the LCD 61.

The image for monitor control is an image for controlling the monitor 2 and is, for example, an image as shown in FIG. 14. In an example of FIG. 14, a user can switch channels, switch inputs, and control volume of the monitor 2 by, for example, touching the image for monitor control. Specifically, a touch position of the user is detected by the touch panel 62 provided on the LCD 61, and in accordance with the touch position, an infrared signal (monitor control signal) is outputted from the infrared communication module 612 (see FIGS. 5, 13).

In the monitor control mode also, in the same manner as in FIG. 11, the mode of operation can be switched from the monitor control mode to the monitor game mode or the terminal device game mode by calling the image for mode switching.

When the monitor control mode is switched to the monitor game mode or the terminal device game mode, if a game is paused in the middle of the game, the game is resumed from a state immediately prior to being paused. Accordingly, when, for example, a user (user A) is playing a game in the monitor game mode and another user (user B) desires to view a television program of channel 8, the user A switches the mode of operation from the monitor game mode to the monitor control mode, selects "channel 8" with the terminal device 6, and switches the mode of operation from the monitor control mode to the terminal device game mode. Thereby, the user A can resume the game.

Next, the operation of the game system 1 will be described further in detail with reference to FIGS. 15 to 18.

Figure 15:
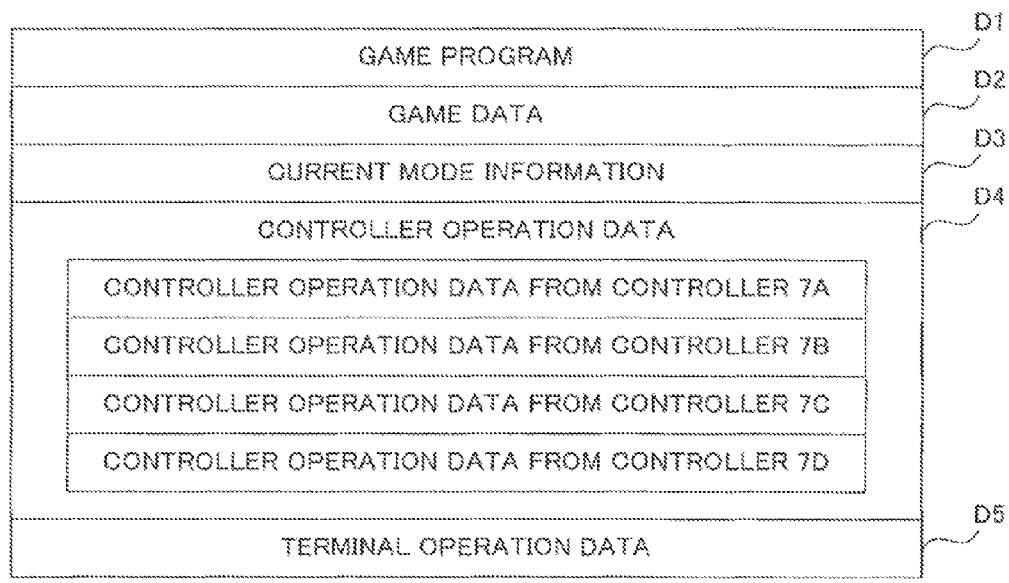
FIG. 15 shows a non-limiting example of a memory map of an external main memory 12.

FIG. 15 shows an example of various data stored in the external main memory 12 of the game apparatus body 5.

A game program D1 is a program executed by the CPU 10 of the game apparatus body 5. The game program D1 is, for example, loaded into the external main memory 12 from the optical disc 4.

Game data D2 contains various data required for the game processing, that is, for example, information of positions, orientations, states, images of various objects (player characters, enemy characters, topography objects, and the like) in a game world, information of background images, and the like.

Current mode information D3 is information representing a current mode (that is, the monitor game mode, the terminal device game mode or the monitor control mode) of operation of the game system 1.

Controller operation data D4 is operation data which is periodically transmitted from the controller 7. It should be noted that when a plurality of main players simultaneously play a game by using a plurality of controllers 7 among the controllers 7a to 7d, controller operation data from the plurality of controllers 7 are stored in the external main memory 12 so as to be distinguished from each other.

Terminal operation data D5 is operation data which is periodically transmitted from the terminal device 6. As described above, the terminal operation data D5 contains the touch position data, the stick data, the operation button data, and the like.

Next, with reference to flow charts of FIGS. 16 to 18, a flow of processing executed by the CPU 10 of the game apparatus body 5 based on the game program D1 will be described.

Figure 16:
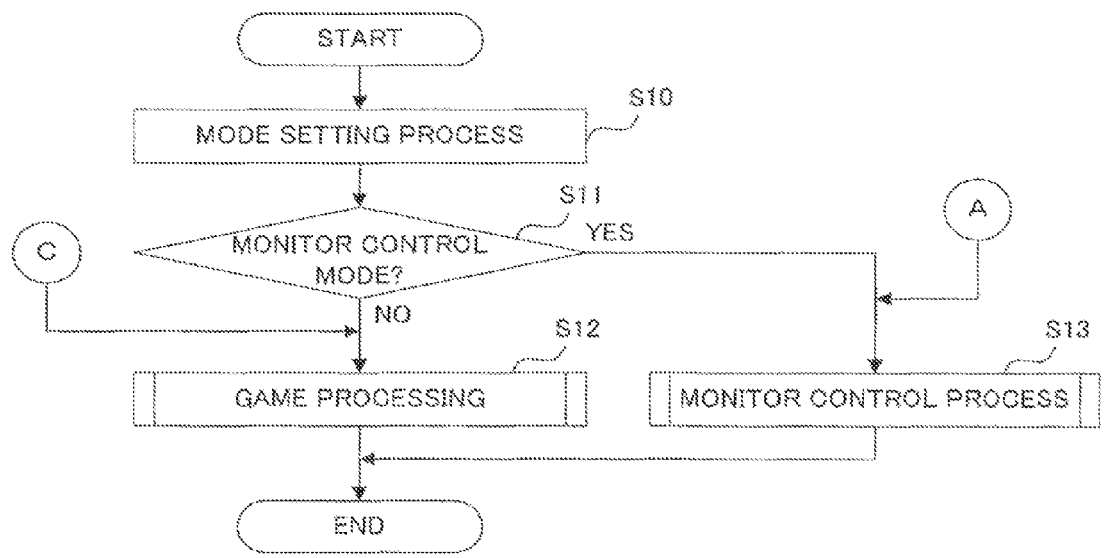
FIG. 16 shows a non-limiting example of a flow chart illustrating a flow of processing based on a game program D1.

When execution of the game program D1 is started, the CPU 10 performs a mode setting process at step S10 of FIG. 16. Specifically, for example, the CPU 10 causes an image for mode selection for allowing a user to select the mode of operation to be displayed on the monitor 2 and/or the LCD 61 so that the user can select a desired mode of operation, and the CPU 10 sets the current mode information D3 in accordance with the selected mode of operation.

In step S11, the CPU 10 determines whether the current mode of operation is the monitor control mode based on the current mode information D3. When the current mode of operation is the monitor control mode, the CPU 10 proceeds the processing to step S13. Otherwise (that is, when the current mode of operation is either the monitor game mode or the terminal device game mode), the CPU 10 proceeds the processing to step S12.

In step S12, the CPU 10 executes game processing. Details of the game processing in step S12 will be described later in detail. When the game processing of step S12 is ended, the CPU 10 ends the execution of the game program D1.

In step S13, the CPU 10 executes a monitor control process. Details of the monitor control process of step S13 will be described later in detail. When the monitor control process of step S13 is ended, the CPU 10 ends the execution of the game program D1.

Next, with reference to FIG. 17, the game processing of step S12 of FIG. 16 will be described in detail.

In step S20, the CPU 10 performs initial setting. In the initial setting, a process of setting positions of respective player characters and enemy characters in a game world to initial positions is performed.

In step S21, the CPU 10 obtains the controller operation data D4 and the terminal operation data D5 from the controller 7 and the terminal device 6, respectively.

In step S22, the CPU 10 determines whether the current mode of operation is the monitor game mode based on the current mode information D3. When the current mode of operation is the monitor game mode, the CPU 10 proceeds the processing to step S23. Otherwise (that is when the current mode of operation is the terminal device game mode), the CPU 10 proceeds the processing to step S24.

In step S23, the CPU 10 controls the player characters, and the like based on the controller operation data D4. It should be noted that, as described above, when the user calls the image for mode switching as shown in FIG. 9 by pressing a predetermined button of the controller 7, the CPU 10 controls a cursor or the like for selecting the mode of operation instead of controlling the player characters, and the like.

In step S24, the CPU 10 controls the player characters and the like based on the terminal operation data D5. It should be noted that, as described above, when the user calls the image for mode switching as shown in FIG. 11 by pressing a predetermined button of the terminal device 6, the CPU 10 controls a cursor or the like for selecting the mode of operation instead of controlling the player characters and the like.

In step S25, the CPU 10 generates a main game image. A process of generating the main game image may be performed by the GPU 32 in accordance with an instruction from the CPU 10. It should be noted that the CPU 10 may generate, in accordance with the current mode of operation, a main game image of a format suitable for a display device to which the main game image is to be outputted. For example, when the resolution of the screen of the monitor 2 is different from that of the LCD 61 of the terminal device 6, the CPU 10 may generate a main game image having a resolution (number of pixels) that varies depending on the current mode of operation. In another embodiment, a resolution of a main game image may be converted depending on the current mode of operation. In still another embodiment, a resolution of a main game image outputted from the game apparatus body 5 may be converted appropriately in the monitor 2 and/or the terminal device 6.

In step S26, the CPU 10 determines whether the current mode of operation is the monitor game mode based on the current mode information D3. When the current mode of operation is the monitor game mode, the CPU 10 proceeds the processing to step S27. Otherwise (that is, when the current mode of operation is the terminal device game mode), the CPU 10 proceeds the processing to step S30.

In step S27, the CPU 10 outputs the main game image generated in step S25 to the monitor 2. As a result, the main game image is displayed on the monitor 2. It is preferable that the main game image data is outputted to the monitor 2 in a general-purpose output format so that a general-purpose stationary display device can be used as the monitor 2.

In step S28, the CPU 10 generates a sub game image. The process of generating the sub game image may be performed by the GPU 32 in accordance with an instruction from the CPU 10.

In step S29, the CPU 10 outputs the sub game image generated in step S28 to the terminal device 6. As a result, the sub game image is displayed on the LCD 61 of the terminal device 6.

In step S30, the CPU 10 outputs the main game image generated in step S25 to the terminal device 6. As a result, the main game image is displayed on the LCD 61 of the terminal device 6. It is preferable that the CPU 10 outputs, to the terminal device 6, the main game image data in an output format specific to the terminal device 6 by, for example, performing a compression process by means of the codec LSI 27 before outputting the main game image data so that a delay time between a time when the main game image is outputted from the game apparatus body 5 and a time when the main game image is displayed on the LCD 61 is decreased as much as possible.

In step S31, the CPU 10 determines whether a mode switching instruction has been inputted from the user (that is, whether the user has selected a mode of operation which is different from the current mode of operation on the image for mode switching shown in FIG. 9 or FIG. 11). Then, when a mode switching instruction has been inputted, the CPU 10 proceeds the processing to step S33. Otherwise, the CPU proceeds the processing to step S32.

In step S32, the CPU 10 determines whether the game has been ended. When the game has been ended, the CPU 10 ends the game processing. Otherwise, the CPU 10 returns the processing to step S21.

In step S33, the CPU 10 updates the current mode information D3 in accordance with the mode switching instruction from the user.

In step S34, the CPU 10 determines whether the current mode of operation is the monitor control mode based on the current mode information D3. When the current mode of operation is the monitor control mode, the CPU 10 proceeds the processing to step S35. Otherwise (that is, when the current mode of operation is the monitor game mode or the terminal device game mode), the CPU 10 proceeds the processing to step S32.

In step S35, the CPU 10 pauses the game being played (that is, the CPU stores the game data D2 so that the game can be resumed from a state immediately prior to being paused). Then, the CPU 10 proceeds the processing to step S13 (the monitor control process) of FIG. 16.

Subsequently, with reference to FIG. 18, the monitor control process in step S13 of FIG. 16 will be described in detail.

In step S40, the CPU 10 generates, for example, an image for monitor control as shown in FIG. 14.

In step S41, the CPU 10 outputs the image for monitor control to the terminal device 6. As a result, the image for monitor control is displayed on the LCD 61 of the terminal device 6.

In step S42, the CPU 10 obtains the terminal operation data D5 from the terminal device 6.

In step S43, the CPU 10 causes the terminal device 6 to output a monitor control signal based on the terminal operation data D5. Specifically, based on the touch position data contained in the terminal operation data D5, the CPU 10 detects a position touched by the user on the image for monitor control. Then, the CPU 10 transmits control data to the terminal device 6 so that the monitor control signal corresponding to the position touched by the user can be outputted from the infrared communication module 612 of the terminal device 6.

In step S44, the CPU 10 determines whether a mode switching instruction has been inputted from the user (that is, whether the user has selected the monitor game mode or the terminal device game mode on the image for mode switching). When the mode switching instruction has been inputted, the CPU proceeds the processing to step S46. Otherwise, the CPU 10 proceeds the processing to step S45.

In step S45, the CPU 10 determines whether the monitor control has been ended. When the monitor control has been ended, the CPU 10 ends the monitor control process. Otherwise, the CPU 10 returns the processing to step S40.

In step S46, the CPU 10 updates the current mode information D3 in accordance with the mode switching instruction from the user.

In step S47, the CPU 10 determines whether the game is being paused. When the game is being paused, the CPU 10 proceeds the processing to step S48. When the game is not being paused, the CPU 10 proceeds the processing to step S12 of FIG. 16, and after performing the initial setting in step S20 of FIG. 17, the CPU 10 starts a game.

In step S48, based on the game data D2 representing the state of the game immediately prior to being paused which is stored in the external main memory 12, the CPU 10 resumes the game from the state immediately prior to being paused. Then, the CPU proceeds the processing to step S21 of FIG. 17.

As described above, in the exemplary embodiment, the monitor game mode for displaying the main game image on the monitor 2 and the terminal device game mode for displaying the main game image on the LCD 61 of the terminal device 6 can be switched to/from as appropriate. Accordingly, a game can be played by using the monitor 2 in a situation where the monitor 2 can be used. Meanwhile, a game can be played even in a situation where the monitor 2 cannot be used.

Further, in the exemplary embodiment, the sub game image is displayed on LCD 61 in the monitor game mode. Thus, useful information can be provided to a user by using the LCD 61.

Still further, in the exemplary embodiment, at a time of switching the mode of operation, a game being played need not be temporarily ended and the game can be continued after the mode of operation is switched.

Still further, in the exemplary embodiment, since the terminal device 6 is provided with the operation sections (the operation button 64, the touch panel 62, and the like), the terminal device 6 can be used like a handheld game machine in the terminal device game mode.

Still further, in the exemplary embodiment, the game processing is performed based on the controller operation data D4 in the monitor game mode and performed based on the terminal operation data D5 in the terminal device game mode. Accordingly, for example, when a user is playing a game using the controller 7 in the monitor game mode, even if another user presses the operation button 64 of the terminal device 6, no game error will be occurred.

Still further, in the exemplary embodiment, a user can remotely control the monitor 2 using the terminal device 6 in the monitor control mode. Consequently, for example, when the user is playing a game in the terminal device game mode, the user is allowed to switch images (television programs, or the like) of other than the game to be displayed on the monitor 2 and to control the volume outputted from the monitor 2.

Yet further, in the exemplary embodiment, when the monitor game mode or the terminal device game mode is switched to the monitor control mode, the game being played is paused, and when the monitor control mode is switched later to the monitor game mode or the terminal device game mode, the game can be resumed from a state immediately prior to being paused.

It should be noted that the above exemplary embodiment is a mere example.

Figure 19:
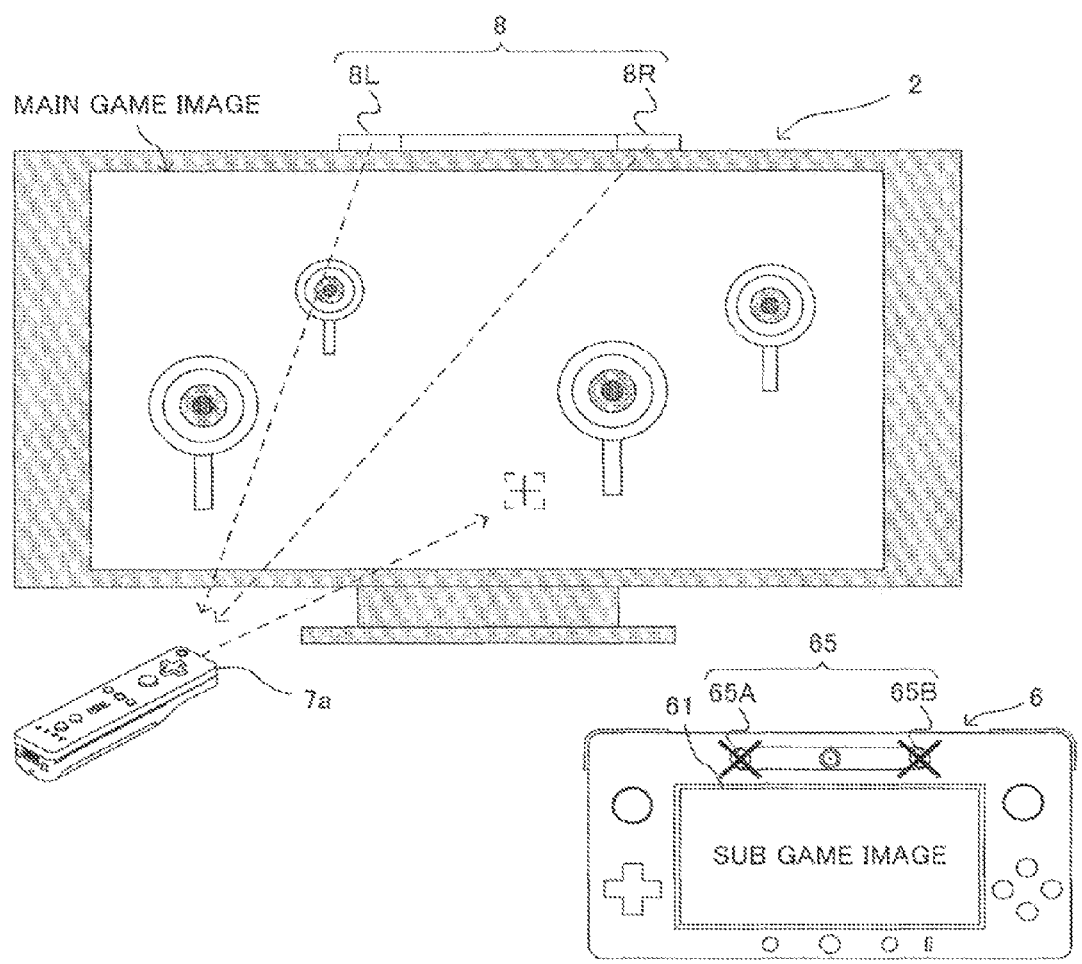
FIG. 19 is a diagram showing another non-limiting example of the screens of the monitor 2 and the LCD 61 in the monitor game mode.

For example, in the above exemplary embodiment, the user plays a game using the operation sections of the terminal device 6 in the terminal device game mode. However, in another embodiment, the user may use the controller 7 to play a game in the terminal device game mode in the same manner as in the monitor game mode. It should be noted that, as an example of a case where it is preferable that the user uses the controller 7 to play a game in the terminal device game mode is a case where, as shown in FIG. 19 and FIG. 20, the user plays a game in which the user aims at a target included in the main game image by using the controller 7. At this time, if light is outputted simultaneously from the marker 8 provided in the vicinity of the monitor 2 and the marker section 65 of the terminal device 6, a position which the user designates on the main game image may be erroneously detected. In order to prevent such an erroneous detection, only the marker 8 may be caused to emit light in the monitor game mode as shown in FIG. 19, and only the marker section 65 may be caused to emit light in the terminal device game mode as shown in FIG. 20.

Further, in the above exemplary embodiment, the game processing is performed based on the controller operation data D4 in the monitor game mode and performed based on the terminal operation data D5 in the terminal device game mode. However, in another embodiment, the game processing may be performed based on the terminal operation data D5 in the monitor game mode. Further, in another embodiment, the game processing may be performed based on both the controller operation data D4 and the terminal operation data D5 in the monitor game mode.

Further, in the above exemplary embodiment, the mode of operation of the game system 1 is switched at a point of time at which a mode switching instruction is inputted from the user. However, in another embodiment, the mode of operation may be switched based on another condition. For example, the mode of operation may be switched from the monitor game mode to the terminal device game mode when a time (for example, a start time of a television program) having been preset by the user has come. Accordingly, the user can be prevented from missing a television program he/she desires to view.

Further, in the above exemplary embodiment, the CPU 10 executes the game processing. However, in another embodiment, the CPU 10 may execute any process (for example, a document creation process) other than the game processing.

Figure 17:
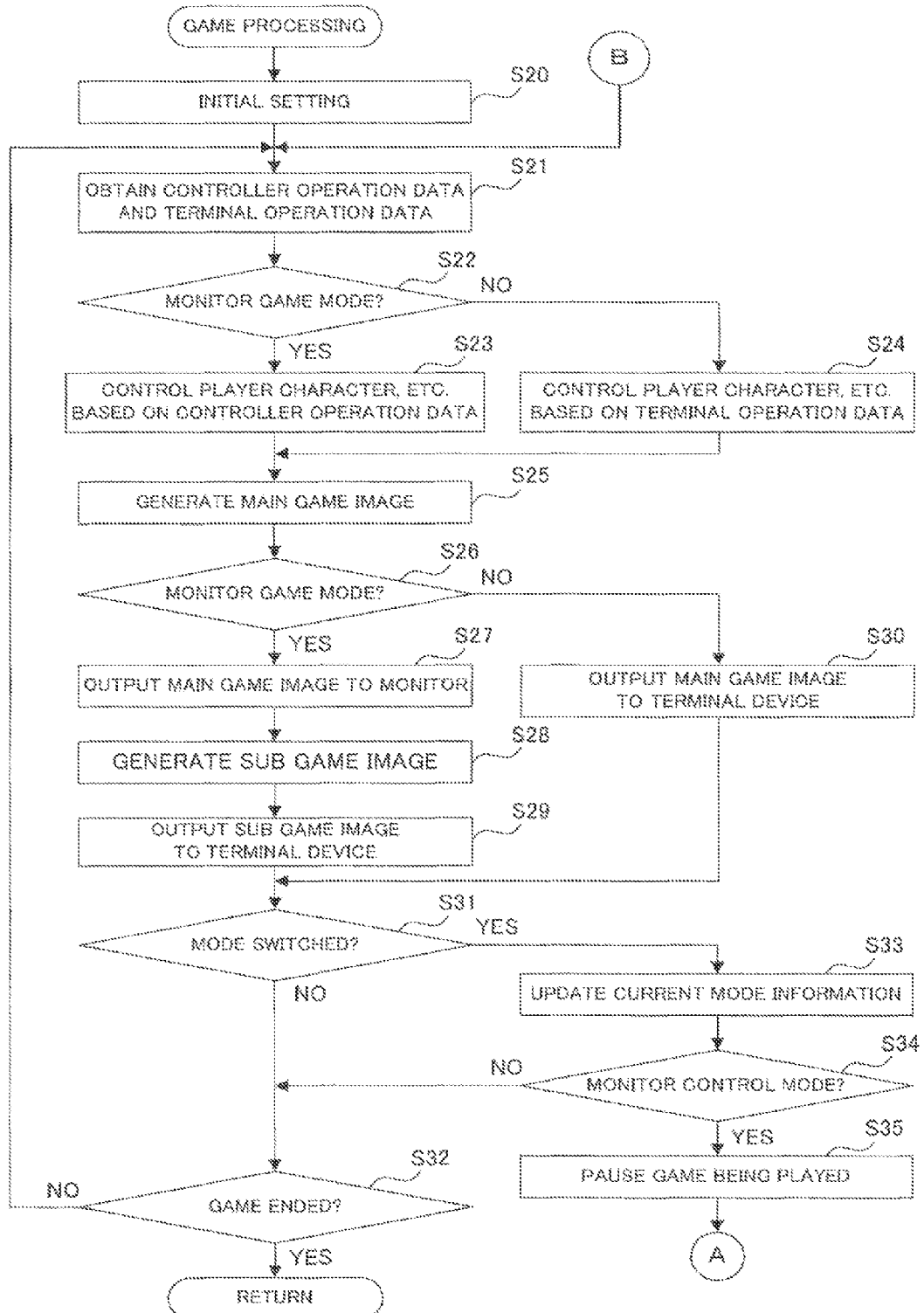
FIG. 17 shows a non-limiting example of a flow chart illustrating a flow of game processing.
Figure 18:
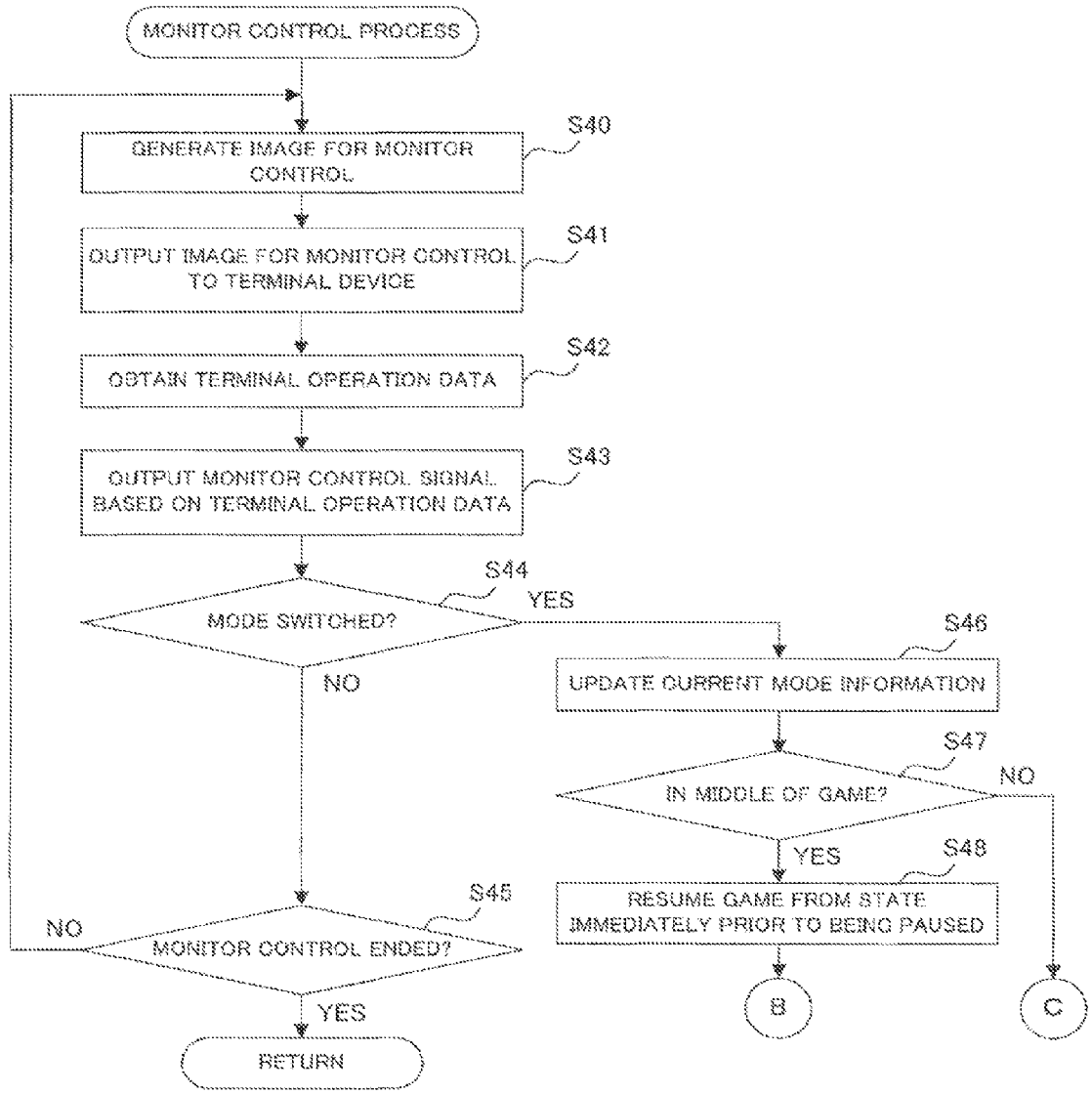
FIG. 18 shows a non-limiting example of a flow chart illustrating a flow of a monitor control process.

Further, in the above exemplary embodiment, a plurality of processes shown in FIGS. 16 to 18 are executed by a single computer (the CPU 10). However, in another embodiment, the plurality of processes may be shared and executed by a plurality of computers (for example, the processes in steps S40 to 44 of FIG. 18 may be executed by the CPU 617 of the terminal device). Further, in another embodiment, a part of the plurality of processes may be realized by a hardware circuit.

Further, in the above exemplary embodiment, a single information processing apparatus (the game apparatus body 5) executes the plurality of processes shown in FIGS. 16 to 18. However, in another embodiment, the plurality of processes may be shared and executed by a plurality of information processing apparatuses (for example, the game apparatus body 5 and the terminal device 6, or the game apparatus body 5 and the server apparatus, and the like).

Further, in the above exemplary embodiment, the game program D1 is loaded into the game apparatus body 5 from the optical disc 4. However, in another embodiment, the game program D1 may be loaded into the game apparatus body 5 from any computer-readable storage medium (for example, a CD-ROM, a semiconductor memory, or the like). Further, in another embodiment, the game program D1 may be prestored in a nonvolatile memory (the ROM/RTC 13, the flash memory 17) in the game apparatus body 5. Further, in another embodiment, the game program D1 may be transmitted to the game apparatus body 5 from another information processing apparatus (a game apparatus or a server apparatus).

The systems, devices and apparatuses described herein may include one or more processors, which may be located in one place or distributed in a variety of places communicating via one or more networks. Such processor(s) can, for example, use conventional 3D graphics transformations, virtual camera and other techniques to provide appropriate images for display. By way of example and without limitation, the processors can be any of: a processor that is part of or is a separate component co-located with the stationary display and which communicates remotely (e.g., wirelessly) with the movable display; or a processor that is part of or is a separate component co-located with the movable display and communicates remotely (e.g., wirelessly) with the stationary display or associated equipment; or a distributed processing arrangement some of which is contained within the movable display housing and some of which is co-located with the stationary display, the distributed portions communicating together via a connection such as a wireless or wired network; or a processor(s) located remotely (e.g., in the cloud) from both the stationary and movable displays and communicating with each of them via one or more network connections; or any combination or variation of the above.

The processors can be implemented using one or more general-purpose processors, one or more specialized graphics processors, or combinations of these. These may be supplemented by specifically-designed ASICs (application specific integrated circuits) and/or logic circuitry. In the case of a distributed processor architecture or arrangement, appropriate data exchange and transmission protocols are used to provide low latency and maintain interactivity, as will be understood by those skilled in the art.

Similarly, program instructions, data and other information for implementing the systems and methods described herein may be stored in one or more on-board and/or removable memory devices. Multiple memory devices may be part of the same device or different devices, which are co-located or remotely located with respect to each other.

While the exemplary embodiments have been described in detail, the foregoing description is in all aspects illustrative and not restrictive. It is understood that numerous other modifications and variations can be devised.

What is claimed is:

1. A non-transitory computer-readable storage medium having stored therein an information processing program which causes a computer of an information processing apparatus configured to output an image to a portable display device and a stationary display device to perform functionality comprising:
   executing a predetermined information process;
   generating a main image in accordance with the predetermined information process;
   generating a sub image in accordance with the predetermined information process;
   selecting a mode of operation from among a plurality of modes of operation including a first mode for displaying the main image on the portable display device and a second mode for displaying the main image on the stationary display device and displaying the sub image on the portable display device; and
   outputting the main image to the portable display device in the first mode and outputting the main image to the stationary display device and outputting the sub image to the portable display device in the second mode, the sub image not being displayed on the portable display device in the first mode.

2. The non-transitory computer-readable storage medium according to claim 1, wherein the information processing program further causes the computer to perform features comprising:
   receiving a mode switching instruction from a user, and
   switching the mode of operation based on the mode switching instruction.

3. The non-transitory computer-readable storage medium according to claim 1, wherein the information processing program further causes the computer to perform features comprising switching, when the mode switching instruction is inputted, the mode of operation without temporarily ending the predetermined information process being executed.

4. The non-transitory computer-readable storage medium according to claim 1, wherein
   the information processing apparatus includes a controller, and
   the predetermined information process is executed based on a signal from an operation section of the portable display device in the first mode and the predetermined information process is executed based on a signal from the controller in the second mode.

5. The non-transitory computer-readable storage medium according to claim 1, wherein the information processing program causes the computer to perform features comprising generating, in accordance with the selected mode of operation, the main image in a format suitable for a display device to which the main image is to be outputted.

6. The non-transitory computer-readable storage medium according to claim 1, wherein
   the main image is output to the stationary display device in a general-purpose output format and the main image is output to the portable display device in an output format specific to the portable display device.

7. The non-transitory computer-readable storage medium according to claim 1, wherein
   the portable display device includes an operation section, and
   the information processing program further causes the computer the computer to perform features comprising:
   selecting, in addition to the first mode and the second mode, a stationary display device control mode for remotely controlling the stationary display device by using the operation section of the portable display device, and
   outputting, in the stationary display device control mode, an image for control for controlling the stationary display device to the portable display device.

8. The non-transitory computer-readable storage medium according to claim 7, wherein the information processing program further causes the computer to perform features comprising suspending, when the first mode or the second mode is switched to the stationary display device control mode, the predetermined information process being executed, and resuming, when the stationary display device control mode is switched to the first mode or the second mode, the predetermined information process from a state immediately prior to being suspended.

9. The non-transitory computer-readable storage medium according to claim 1, wherein
   the portable display device includes a marker having one or more light emitters,
   the information processing apparatus includes a controller having an imaging device which takes an image of the marker,
   the information processing program further causes the computer to perform features comprising calculating a designated position on the main image designated by a user based on a position of light, from the light emitter, which appears on an image taken by the imaging device, and
   executing the predetermined information process based on the calculated designated position.

10. The non-transitory computer-readable storage medium according to claim 1, wherein
    the portable display device includes a first marker having one or more light emitters,
    the stationary display device has, in the vicinity thereof, a second marker having one or more light emitters,
    the information processing apparatus includes a controller having an imaging device which takes an image of the first marker and the second marker,
    the information processing program further causes the computer to perform features comprising:
      causing only the first marker of the first marker and the second marker to emit light in the first mode and causing only the second marker of the first marker and the second marker to emit light in the second mode;
      calculating a designated position on the main image designated by a user based on a position of light, from the light emitter, which appears on an image taken by the imaging device; and
      executing the predetermined information process based on the calculated designated position.

11. The non-transitory computer-readable storage medium according to claim 1, wherein
    the information processing apparatus includes a plurality of controllers, and
    the predetermined information process is executed based on signals from the plurality of controllers at least in the second mode.

12. The non-transitory computer-readable storage medium according to claim 1, wherein the predetermined information process is game processing.

13. The non-transitory computer-readable storage medium according to claim 1, wherein the main image is output to the portable display device via wireless transmission.

14. The non-transitory computer-readable storage medium according to claim 1, wherein the main image is compressed and output to the portable display device.

15. The non-transitory computer-readable storage medium having stored therein the information processing program according to claim 1, wherein the main image is output to the portable display device in the first mode and the main image is output to the stationary display device without displaying the main image on the portable display device in the second mode.

16. The non-transitory computer-readable storage medium having stored therein the information processing program according to claim 1, wherein the main image is output to the portable display device without displaying the main image on the stationary display device in the first mode and the main image is output to the stationary display device without displaying the main image on the portable display device in the second mode.

17. An information processing apparatus having at least one processor and configured to output an image to a portable display device and a stationary display device, the information processing apparatus configured to:
    execute a predetermined information process;
    generate a main image in accordance with the predetermined information process;
    generate a sub image in accordance with the predetermined information process;
    select a mode of operation from among a plurality of modes of operation including a first mode for displaying the main image on the portable display device and a second mode for displaying the main image on the stationary display device and displaying the sub image on the portable display device; and
    output the main image to the portable display device in the first mode and output the main image to the stationary display device and output the sub image to the portable display device in the second mode, the sub image not being displayed on the portable display device in the first mode.

18. An information processing system configured to output an image to a portable display device and a stationary display device, the information processing system comprising:
    a processing system having at least one processor, the processing system configured to:
      execute a predetermined information process,
      generate a main image in accordance with the predetermined information process,
      generate a sub image in accordance with the predetermined information process,
      select a mode of operation from among a plurality of modes of operation including a first mode for displaying the main image on the portable display device and a second mode for displaying the main image on the stationary display device and displaying the sub image on the portable display device, and
      output the main image to the portable display device in the first mode and output the main image to the stationary display device and output the sub image to the portable display device in the second mode, the sub image not being displayed on the portable display device in the first mode.

19. An information processing method executed on an information processing system configured to output an image to a portable display device and a stationary display device, the information processing method comprising:
    executing a predetermined information process;
    generating a main image in accordance with the predetermined information process;
    generating a sub image in accordance with the predetermined information process;
    selecting a mode of operation from among a plurality of modes of operation including a first mode for displaying the main image on the portable display device and a second mode for displaying the main image on the stationary display device and displaying the sub image on the portable display device; and outputting the main image to the portable display device in the first mode and outputting the main image to the stationary display device and outputting the sub image to the portable display device in the second mode, the sub image not being displayed on the portable display device in the first mode.

* * * * *